United States Patent
Takano et al.

(10) Patent No.: US 7,456,683 B2
(45) Date of Patent: Nov. 25, 2008

(54) AMPLITUDE ERROR COMPENSATING DEVICE AND QUADRATURE SKEW ERROR COMPENSATING DEVICE

(75) Inventors: Haruka Takano, Osaka (JP); Shigeru Soga, Hyogo (JP)

(73) Assignee: Panasonic Corporation, Osaka (JP)

( * ) Notice: Subject to any disclaimer, the term of this patent is extended or adjusted under 35 U.S.C. 154(b) by 156 days.

(21) Appl. No.: 11/660,968

(22) PCT Filed: May 31, 2006

(86) PCT No.: PCT/JP2006/010887

§ 371 (c)(1),
(2), (4) Date: Feb. 23, 2007

(87) PCT Pub. No.: WO2006/132118

PCT Pub. Date: Dec. 14, 2006

(65) Prior Publication Data

US 2008/0030264 A1 Feb. 7, 2008

(30) Foreign Application Priority Data

Jun. 9, 2005 (JP) .............................. 2005-169624

(51) Int. Cl.
*H04L 27/38* (2006.01)
*H04L 27/22* (2006.01)
(52) U.S. Cl. ........................ 329/349; 375/346
(58) Field of Classification Search ................. 329/349; 375/345, 346, 285, 322, 326; 455/296
See application file for complete search history.

(56) References Cited

U.S. PATENT DOCUMENTS 6,310,513 B1 10/2001 Iemura

| 7,356,103 B2 * | 4/2008 | Nishikawa | 375/345 |
| 2002/0057752 A1 | 5/2002 | Denno | |
| 2005/0147190 A1 * | 7/2005 | Nishikawa | 375/343 |

FOREIGN PATENT DOCUMENTS

| EP | 1777906 A1 * | 4/2007 |
| JP | 3-53735 | 3/1991 |

(Continued)

*Primary Examiner*—Daniel D Chang
(74) *Attorney, Agent, or Firm*—McDermott Will & Emery LLP

(57) ABSTRACT

An amplitude error compensating device comprises an amplitude correcting section for performing amplitude correction with respect to an in-phase component and a quadrature component of a complex signal obtained by quadrature demodulation, based on amplitude error information, and outputting a resultant amplitude-corrected complex signal, and an amplitude error detecting section for obtaining the amplitude error information, depending on amplitudes of an in-phase component and a quadrature component of the amplitude-corrected complex signal. The amplitude error detecting section comprises a power difference calculating section for obtaining as a power error a difference in power between the in-phase component and the quadrature component of the amplitude-corrected complex signal, a rotation detecting section for detecting a rotation of a signal point of the amplitude-corrected complex signal, an error information control section for outputting the power error when a rotation of the signal point has been detected, and 0 when a rotation of the signal point has not been detected, and a smoothing section for smoothing an output of the error information control section, and outputting the result as the amplitude error information.

10 Claims, 18 Drawing Sheets

FOREIGN PATENT DOCUMENTS

| | | |
|---|---|---|
| JP | 7-297874 | 11/1995 |
| JP | 10-56484 | 2/1998 |
| JP | 2000-244592 | 9/2000 |
| JP | 2002-199039 | 7/2002 |
| JP | 2003-258931 | 9/2003 |
| WO | WO 2006132118 A1 * | 12/2006 |

* cited by examiner

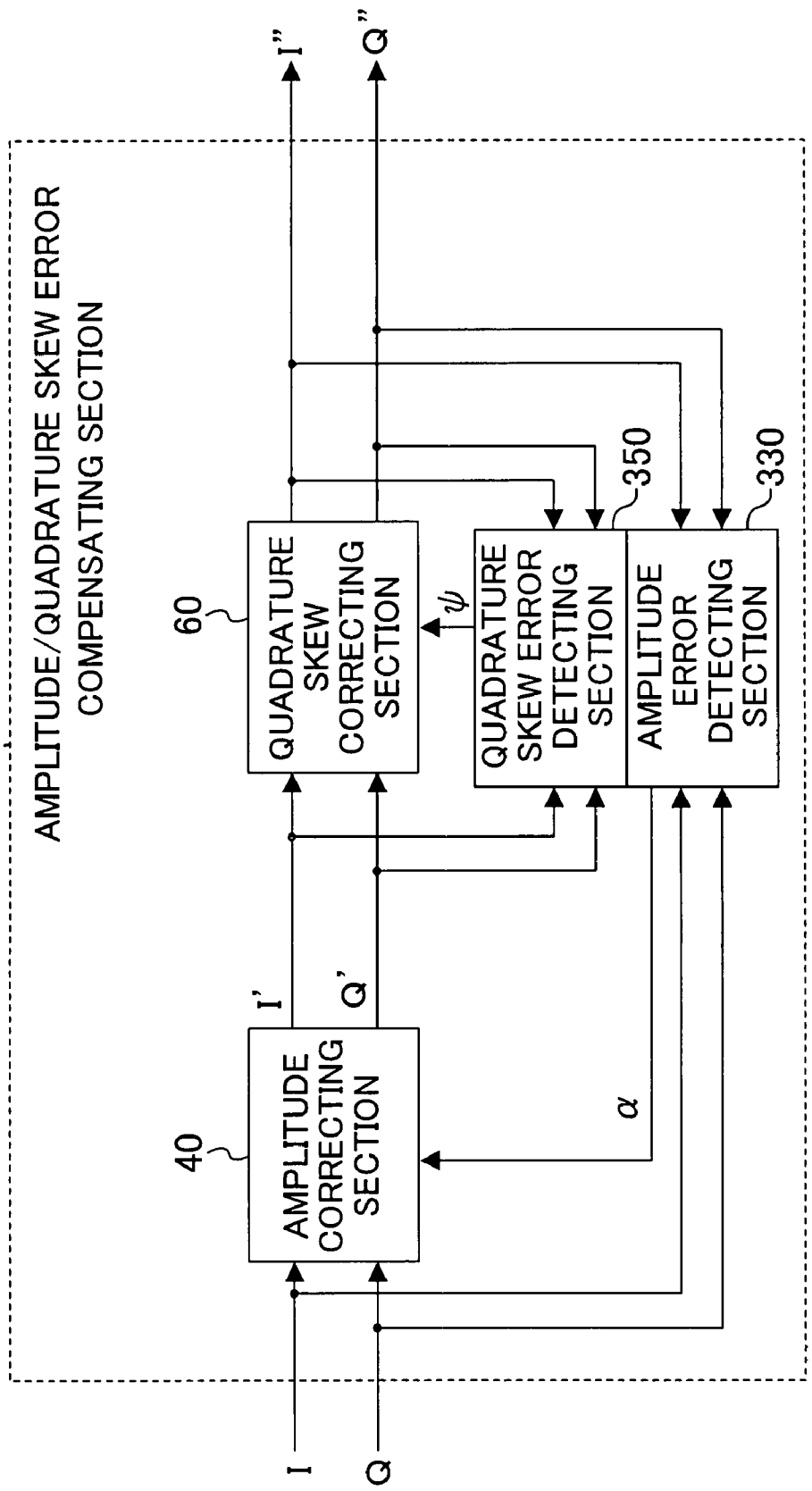

US 7,456,683 B2

AMPLITUDE ERROR COMPENSATING DEVICE AND QUADRATURE SKEW ERROR COMPENSATING DEVICE

RELATED APPLICATIONS

This application is the U.S. National Phase under 35 U.S.C. § 371 of International Application No. PCT/JP2006/310887, filed on May 31, 2006, which in turn claims the benefit of Japanese Application No. 2005-169624, filed on Jun. 9, 2005, the disclosures of which Applications are incorporated by reference herein.

TECHNICAL FIELD

The present invention relates to a demodulation device for use in digital radio communication. More particularly, the present invention relates to a device for detecting and correcting an amplitude error or a quadrature skew error between an in-phase component and a quadrature component of a complex signal obtained by quadrature demodulation in an analog quadrature demodulation section.

BACKGROUND ART

Digital modulation schemes for use in digital radio communication include digital phase modulation schemes (e.g., BPSK (Binary Phase Shift Keying), QPSK (Quadrature Phase Shift Keying), 8PSK (Phase Shift Keying)), QAM (Quadrature Amplitude Modulation), and the like. When signals modulated by these digital modulation schemes are demodulated, an analog quadrature demodulation section composed of an analog circuit is used to perform quadrature demodulation, and the result is obtained as a complex signal (IQ signal), which is widely practiced.

Here, in an ideal situation, an in-phase component and a quadrature component of the IQ signal output from the analog quadrature demodulation section are orthogonal to each other, and have the same average amplitude. However, the analog quadrature demodulation section is affected by characteristic variations, temperature characteristics, voltage characteristics, and the like of the analog element, so that an amplitude error or a quadrature skew error occurs between the in-phase component and the quadrature component of the IQ signal. Therefore, when the IQ signal output from the analog quadrature demodulation section is directly subjected to detection, a bit error rate (hereinafter referred to as BER) increases.

Patent Document 1 described below discloses a demodulation circuit which determines quadrants on an IQ plane of the IQ signal, stores amplitude values of the IQ signal, depending on the quadrants in which the IQ signal is present, and corrects a quadrature skew error using a difference between the stored amplitude values as quadrature error information.

Patent Document 2 described below discloses an amplitude control circuit which corrects amplitudes of one of an in-phase component and a quadrature component of an input IQ signal using a value obtained by integration of a difference in amplitude value between the in-phase component and the quadrature component using a loop filter.

Patent Document 3 described below discloses a circuit which calculates a coefficient which is adaptively updated by applying the CMA (Constant Modulus Algorithm) to an output of the analog quadrature demodulation section, and corrects and outputs an amplitude error and a quadrature skew error.

Patent Document 1: Japanese Unexamined Patent Publication No. 7-297874
Patent Document 2: Japanese Unexamined Patent Publication No. 2003-258931
Patent Document 3: Japanese Unexamined Patent Publication No. 10-56484

DISCLOSURE OF THE INVENTION

Problems to be Solved by the Invention

However, according to the quadrature skew error compensating circuit described in Patent Document 1, when signal points of an input IQ signal are more frequently distributed in a specific quadrant on the IQ plane than in other quadrants, stored amplitude values are not updated with respect to the specific quadrant, so that a malfunction is likely to occur (e.g., in the case where, during reception of a BPSK-modulated signal, an IQ signal obtained by quadrature demodulation does not have a frequency offset with respect to a carrier wave, as illustrated in FIG. 6 of the present invention).

The amplitude control circuit described in Patent Document 2 may erroneously detect an amplitude error between an in-phase component and a quadrature component in the case of FIG. 6 or when there is not an amplitude error between the two components. Also, since an amplitude of one of an in-phase component and a quadrature component is corrected, a difference may occur between the power of a signal before correction and the power of the signal after correction, resulting in an increase in BER.

The amplitude error and quadrature skew error correcting circuit described in Patent Document 3 cannot perform amplitude error correction and quadrature skew error correction separately, so that an interaction between amplitude error correction and quadrature skew error correction hinders high-accuracy correction. Also, a number of multipliers are required, resulting in an increase in circuit area.

An object of the present invention is to provide an amplitude error compensating device and a quadrature skew error compensating device which can correctly and stably correct an amplitude error and a quadrature skew error even when the distribution of signal points of an input complex signal is not uniform.

Solution to the Problems

The present invention comprises an amplitude correcting section for performing amplitude correction with respect to an in-phase component and a quadrature component of a complex signal obtained by quadrature demodulation, based on amplitude error information, and outputting a resultant amplitude-corrected complex signal, and an amplitude error detecting section for obtaining the amplitude error information, depending on amplitudes of an in-phase component and a quadrature component of the amplitude-corrected complex signal, thereby reducing a difference between the amplitudes of the in-phase component and the quadrature component of the amplitude-corrected complex signal.

Also, the present invention comprises a quadrature skew correcting section for performing quadrature skew correction with respect to a complex signal obtained by quadrature demodulation, based on quadrature skew error information, and outputting a resultant quadrature skew-corrected complex signal, and a quadrature skew error detecting section for obtaining a quadrature skew error between an in-phase component and a quadrature component of the quadrature skew-corrected complex signal, and outputting the quadrature skew error as the quadrature skew error information, thereby decreasing a quadrature skew between the in-phase component and the quadrature component of the quadrature skew-corrected complex signal.

More specifically, the present invention provides an amplitude error compensating device comprising an amplitude correcting section for performing amplitude correction with respect to an in-phase component and a quadrature component of a complex signal obtained by quadrature demodulation, based on amplitude error information, and outputting a resultant amplitude-corrected complex signal, and an amplitude error detecting section for obtaining the amplitude error information, depending on amplitudes of an in-phase component and a quadrature component of the amplitude-corrected complex signal. The amplitude error detecting section comprises a power difference calculating section for obtaining as a power error a difference in power between the in-phase component and the quadrature component of the amplitude-corrected complex signal, a rotation detecting section for detecting a rotation of a signal point of the amplitude-corrected complex signal, and outputting the result as a rotation detect signal, an error information control section for outputting the power error when the rotation detect signal indicates that a rotation of the signal point has been detected, and 0 when the rotation detect signal indicates that a rotation of the signal point has not been detected, and a smoothing section for smoothing an output of the error information control section, and outputting the result as the amplitude error information.

Thereby, a rotation of a signal point of an amplitude-corrected complex signal is detected, and depending on the result, amplitude error information is obtained, thereby making it possible to perform amplitude error correction without a malfunction, even when the distribution of signal points of an input complex signal is not uniform.

In the amplitude error compensating device, preferably, the amplitude correcting section performs the amplitude correction so that a power of the complex signal obtained by quadrature demodulation and a power of the amplitude-corrected complex signal are equal to each other.

Thereby, it is possible to suppress an increase in BER due to a difference in power between before and after correction.

Also, preferably, the amplitude correcting section performs the amplitude correction by multiplying one of the in-phase component and the quadrature component of the complex signal obtained by quadrature demodulation by the amplitude error information, and the other by a value obtained by converting the amplitude error information in accordance with a predetermined relationship.

The present invention also provides an amplitude error compensating device comprising an amplitude correcting section for performing amplitude correction with respect to an in-phase component and a quadrature component of a complex signal obtained by quadrature demodulation, based on amplitude error information, and outputting a resultant amplitude-corrected complex signal, and an amplitude error detecting section for obtaining the amplitude error information, depending on amplitudes of an in-phase component and a quadrature component of the amplitude-corrected complex signal. The amplitude error detecting section comprises a first power calculating section for obtaining a power of the amplitude-corrected complex signal, a second power calculating section for obtaining a power of the complex signal obtained by quadrature demodulation, an averaging section for obtaining an average value of the power obtained by the second power calculating section, and outputting the average value as an average power, a subtractor for obtaining a difference between the power obtained by the first power calculating section and the average power, and outputting the difference as a power difference, an area determining section for determining to which of a plurality of areas on an IQ plane a signal point of the amplitude-corrected complex signal belongs, and outputting the result as an area determination signal, a sign determining section for outputting the power difference or the power difference whose sign has been inverted, in accordance with the area determination signal, and a smoothing section for smoothing an output of the sign determining section, and outputting the result as the amplitude error information.

Thereby, the amplitude error information can be correctly detected, thereby making it possible to perform amplitude error correction without a malfunction, even when the distribution of signal points of an input complex signal is not uniform.

In the amplitude error compensating device, preferably, the area determining section determines which of absolute values of the in-phase component and the quadrature component of the amplitude-corrected complex signal is larger than the other, and outputting the result as the area determination signal.

The present invention also provides a quadrature skew error compensating device comprising a quadrature skew correcting section for performing quadrature skew correction with respect to a complex signal obtained by quadrature demodulation, based on quadrature skew error information, and outputting a resultant quadrature skew-corrected complex signal, and a quadrature skew error detecting section for obtaining a quadrature skew error between an in-phase component and a quadrature component of the quadrature skew-corrected complex signal, and outputting the quadrature skew error as the quadrature skew error information. The quadrature skew error detecting section comprises a power calculating section for obtaining a power of the quadrature skew-corrected complex signal, a quadrant determining section for determining to which of quadrants on an IQ plane a signal point of the quadrature skew-corrected complex signal belongs, and outputting the result as a quadrant determination signal, a sign determining section for outputting a value of the power or the power whose sign has been inverted, as a power error, in accordance with the quadrant determination signal, a rotation detecting section for detecting a rotation of the signal point of the quadrature skew-corrected complex signal, and outputting the result as a rotation detect signal, an error information control section for outputting the power error when the rotation detect signal indicates that the rotation of the signal point has been detected, and 0 when the rotation detect signal indicates that the rotation of the signal point has not been detected, and a smoothing section for smoothing an output of the error information control section, and outputting the result as the quadrature skew error information.

Thereby, a rotation of a signal point of a quadrature skew-corrected complex signal is detected, and depending on the result, quadrature skew error information is obtained, thereby making it possible to perform quadrature skew error correction without a malfunction, even when the distribution of signal points of an input complex signal is not uniform.

The present invention also provides a quadrature skew error compensating device comprising a quadrature skew correcting section for performing quadrature skew correction with respect to a complex signal obtained by quadrature demodulation, based on quadrature skew error information, and outputting a resultant quadrature skew-corrected complex signal, and a quadrature skew error detecting section for obtaining a quadrature skew error between an in-phase component and a quadrature component of the quadrature skew-corrected complex signal, and outputting the quadrature skew error as the quadrature skew error information. The quadrature skew error detecting section comprises a multiplier for multiplying the in-phase component and the quadrature component of the quadrature skew-corrected complex signal, and outputting the result, and a smoothing section for smoothing the result of the multiplication by the multiplier, and outputting the result as the quadrature skew error information.

Thereby, it is possible to suppress the circuit scale of the quadrature skew error detecting section.

The quadrature skew error compensating device preferably further comprises a frequency offset detector for detecting a frequency offset of the quadrature skew-corrected complex signal, and an error information control section for outputting the result of the multiplication by the multiplier to the smoothing section in accordance with the result of the detection by the frequency offset detector.

The present invention also provides a quadrature skew error compensating device comprising a quadrature skew correcting section for performing quadrature skew correction with respect to a complex signal obtained by quadrature demodulation, based on quadrature skew error information, and outputting a resultant quadrature skew-corrected complex signal, and a quadrature skew error detecting section for obtaining a quadrature skew error between an in-phase component and a quadrature component of the quadrature skew-corrected complex signal, and outputting the quadrature skew error as the quadrature skew error information. The quadrature skew error detecting section comprises a first power calculating section for obtaining a power of the quadrature skew-corrected complex signal, a second power calculating section for obtaining a power of the complex signal obtained by the quadrature demodulation, an averaging section for obtaining an average value of the power obtained in the second power calculating section, and outputting the average value as an average power, a subtractor for obtaining a difference between the power calculated by the first power calculating section and the average power, and outputting the difference as a power difference, a quadrant determining section for determining to which of quadrants on an IQ plane a signal point of the quadrature skew-corrected complex signal belongs, and outputting the result as a quadrant determination signal, a sign determining section for outputting a value of the power difference or the power difference whose sign has been inverted, as a power error, in accordance with the quadrant determination signal, and a smoothing section for smoothing an output of the sign determining section, and outputting the result as the quadrature skew error information.

Thereby, quadrature skew error information can be correctly detected, thereby making it possible to perform quadrature skew error correction without a malfunction, even when the distribution of signal points of an input complex signal is not uniform.

The present invention also provides an amplitude/quadrature skew error compensating device comprising an amplitude correcting section for performing amplitude correction with respect to an in-phase component and a quadrature component of a complex signal obtained by quadrature demodulation, based on amplitude error information, and outputting a resultant amplitude-corrected complex signal, an amplitude error detecting section for obtaining the amplitude error information, depending on amplitudes of an in-phase component and a quadrature component of the amplitude-corrected complex signal, a quadrature skew correcting section for performing quadrature skew correction with respect to the amplitude-corrected complex signal, based on quadrature skew error information, and outputting a resultant quadrature skew-corrected complex signal, and a quadrature skew error detecting section for obtaining a quadrature skew error between an in-phase component and a quadrature component of the quadrature skew-corrected complex signal, and outputting the quadrature skew error as the quadrature skew error information.

Effect of the Invention

According to the present invention, it is possible to achieve an amplitude/quadrature skew error compensating device which correctly performs amplitude/quadrature skew error correction without a malfunction. It is also possible to perform amplitude/quadrature skew error correction without occurrence of an error in signal power between before and after correction.

BRIEF DESCRIPTION OF THE DRAWINGS

FIG. 20 is a block diagram illustrating a variation of the configuration of the amplitude/quadrature skew error compensating section of FIG. 17.

Figure 1:
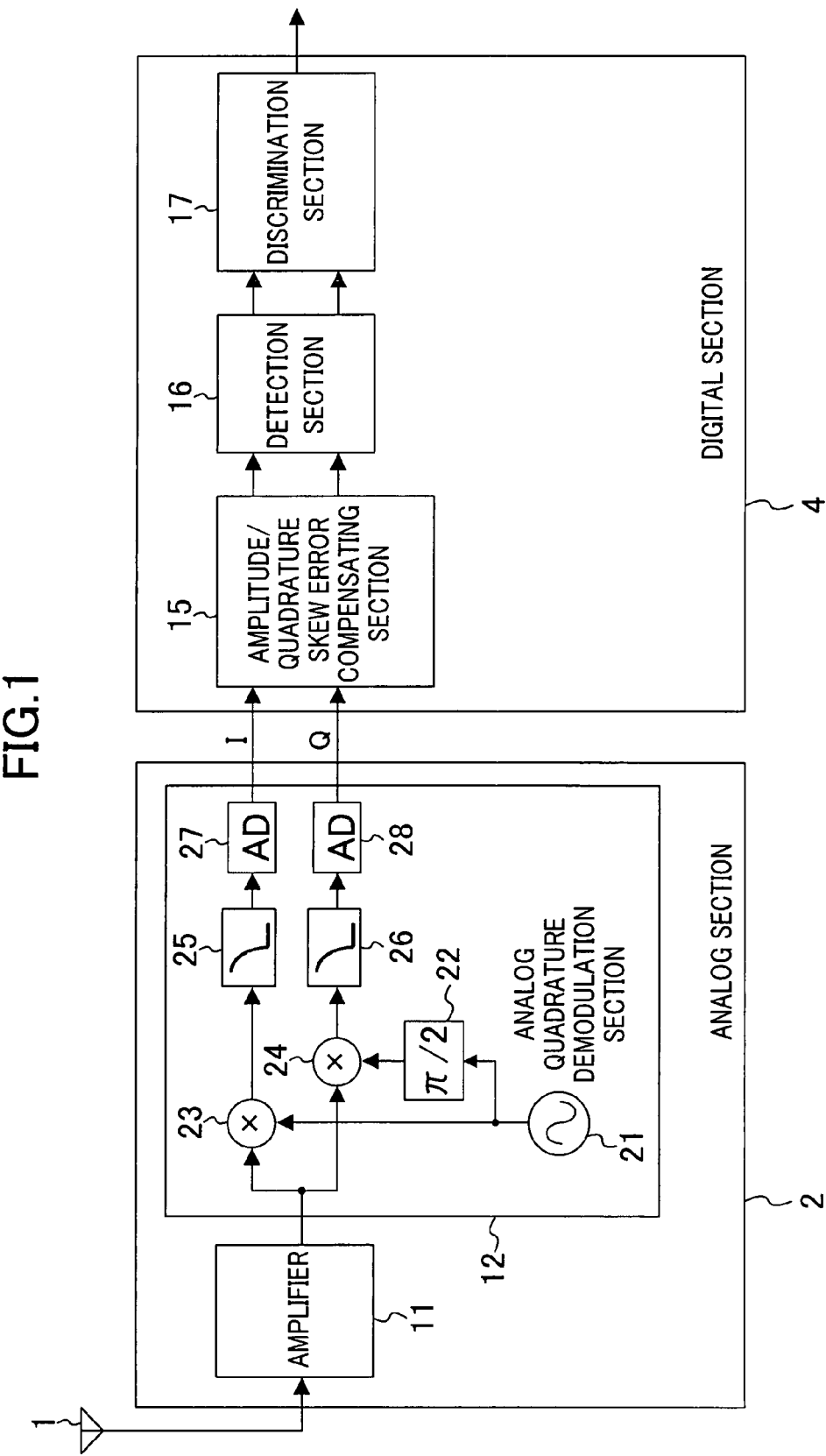
FIG. 1 is a block diagram of a demodulation device according to a first embodiment of the present invention.

DESCRIPTION OF THE REFERENCE CHARACTERS 15, 215, 315, 415 amplitude/quadrature skew error compensating section
30, 330 amplitude error detecting section
31 power difference calculating section
33, 53 rotation detecting section
34, 54, 254 error information control section
35, 55, 255, 335, 355 low-pass filter (smoothing section)
40 amplitude correcting section
50, 250, 350 quadrature skew error detecting section
51, 331, 339, 351, 359 power calculating section
52, 332, 352 sign determining section
56, 356 quadrant determining section
60 quadrature skew correcting section
70 frequency offset detector
251 multiplier
336 area determining section
337, 357 averager
338, 358 subtractor

BEST MODE FOR CARRYING OUT THE INVENTION

Hereinafter, embodiments of the present invention will be described with reference to the accompanying drawings.

First Embodiment

FIG. 1 is a block diagram of a demodulation device according to a first embodiment of the present invention. The demodulation device of FIG. 1 comprises an analog section 2 and a digital section 4. The analog section 2 comprises an amplification section 11 and an analog quadrature demodulation section 12. The digital section 4 comprises an amplitude/quadrature skew error compensating section 15, a detection section 16, and a discrimination section 17.

The amplification section 11 amplifies digital modulated waves received by an antenna 1, and outputs the amplified waves to the analog quadrature demodulation section 12. The analog quadrature demodulation section 12 subjects a signal output from the amplification section 11 to quadrature demodulation, and outputs a resultant signal to the amplitude/quadrature skew error compensating section 15. The quadrature-demodulated signal is a complex signal, which has an in-phase component (in-phase signal) I and a quadrature component (quadrature signal) Q. Hereinafter, the complex signal is referred to as an IQ signal.

The analog quadrature demodulation section 12 has a sine wave generator 21, a $\pi/2$ phase shifter 22, multipliers 23 and 24, low-pass filters 25 and 26, and AD (Analog to Digital) converters 27 and 28.

The sine wave generator 21 generates and outputs a sine wave to the $\pi/2$ phase shifters 22 and the multiplier 23. The $\pi/2$ phase shifter 22 shifts the phase of the output of the sine wave generator 21 by $\pi/2$ and outputs the result to the multiplier 24. The multiplier 23 multiplies the output of the amplification section 11 by the output of the sine wave generator 21 and outputs the result to the low-pass filter 25. The multiplier 24 multiplies the output of the amplification section 11 by the output of the $\pi/2$ phase shifter 22 and outputs the result to the low-pass filter 26.

The low-pass filters 25 and 26 eliminate high frequency components of respective input signals, and output the results to the AD converters 27 and 28, respectively. The AD converters 27 and 28 convert the respective input signals into digital signals, and output the obtained signals as an in-phase component I and a quadrature component Q to the amplitude/quadrature skew error compensating section 15.

The amplitude/quadrature skew error compensating section 15 subjects the in-phase component I and the quadrature component Q output from the AD converters 27 and 28 of the analog quadrature demodulation section 12 to amplitude error correction and quadrature skew error correction, and outputs the result to the detection section 16. The detection section 16 detects the in-phase component I and the quadrature component Q corrected by the amplitude/quadrature skew error compensating section 15, and outputs the result to the discrimination section 17. The discrimination section 17 discriminates signal points on the IQ plane with respect to the output of the detection section 16, and outputs a resultant digital demodulated signal.

Figure 2:
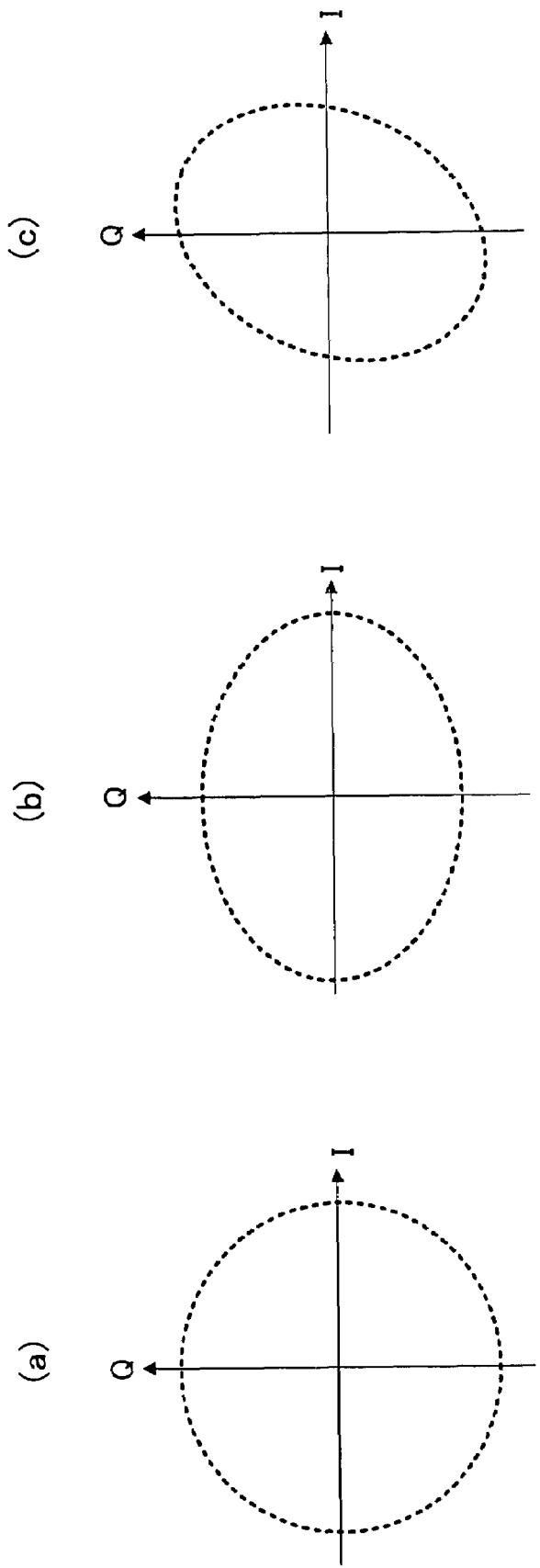
FIG. 2 is a diagram schematically illustrating exemplary average amplitudes of an IQ signal output from an analog quadrature demodulation section as a locus on an IQ plane.

FIGS. 2(*a*), 2(*b*) and 2(*c*) are diagrams schematically illustrating exemplary average amplitudes of the IQ signal output from the analog quadrature demodulation section 12 as a locus on the IQ plane. FIG. 2(*a*) indicates an ideal case. FIG. 2(*b*) indicates the case where there is an amplitude error between the in-phase component I and the quadrature component Q. FIG. 2(*c*) indicates the case where there is a quadrature skew error between the in-phase component I and the quadrature component Q.

The analog quadrature demodulation section 12 is affected by characteristics variations, temperature characteristics, voltage characteristics, and the like of the analog element included therein, so that an amplitude error and a quadrature skew error occur between the in-phase component I and the quadrature component Q output therefrom. Therefore, the amplitude/quadrature skew error compensating section 15 corrects an IQ signal whose average amplitudes are as illustrated in FIGS. 2(*b*) and 2(*c*) into an IQ signal whose average amplitudes are as illustrated in FIG. 2(*a*), or in other words, corrects a distribution of signal points (values of the in-phase component I and the quadrature component Q are represented by an I-axis coordinate and a Q-axis coordinate, respectively), thereby suppressing BER.

Figure 3:
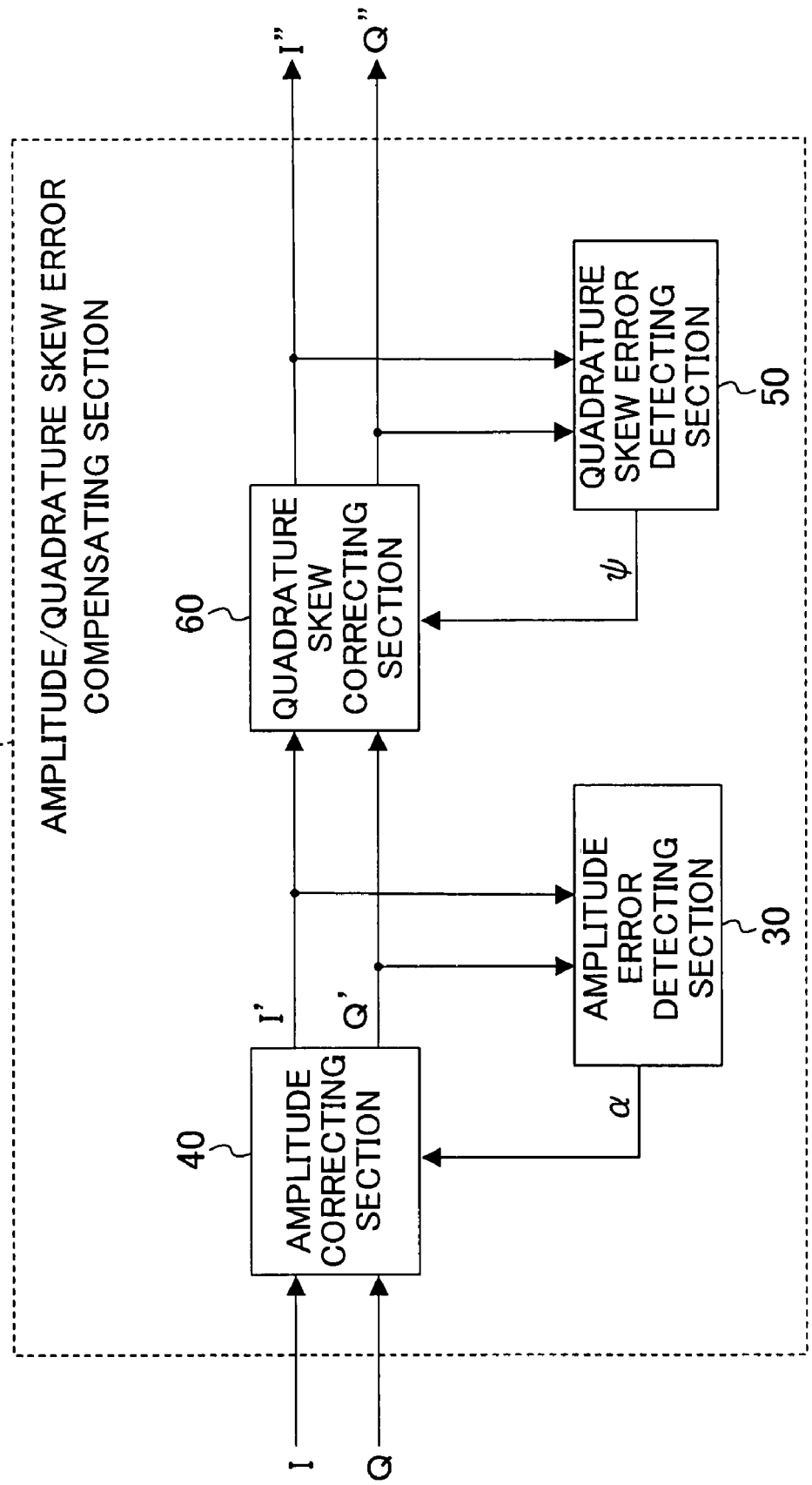
FIG. 3 is a block diagram illustrating an exemplary configuration of an amplitude/quadrature skew error compensating section of FIG. 1.

Next, the amplitude/quadrature skew error compensating section 15 will be described in detail. FIG. 3 is a block diagram illustrating an exemplary configuration of the amplitude/quadrature skew error compensating section 15 of FIG. 1. The amplitude/quadrature skew error compensating section 15 has an amplitude error detecting section 30, an amplitude correcting section 40, a quadrature skew error detecting section 50, and a quadrature skew correcting section 60. The amplitude/quadrature skew error compensating section 15 initially subjects an input IQ signal to amplitude error correction, and then subjects the amplitude error-corrected IQ signal to quadrature skew error correction. In other words, amplitude correction and quadrature skew correction are separately performed.

The amplitude correcting section 40 subjects the in-phase component I and the quadrature component Q output from the analog quadrature demodulation section 12 to amplitude error correction based on an in-phase amplitude error magnification factor α as amplitude error information output from the amplitude error detecting section 30 so that a difference in amplitude between the in-phase component I and the quadrature component Q is reduced, and outputs an amplitude-corrected in-phase component I' and quadrature component Q'. The amplitude error detecting section 30 calculates an in-phase amplitude error magnification factor α for the in-phase component I' and the quadrature component Q', and outputs the in-phase amplitude error magnification factor α to the amplitude correcting section 40. In other words, the amplitude error detecting section 30 and the amplitude correcting section 40 perform feedback correction with respect to amplitude errors.

The quadrature skew correcting section 60 subjects the in-phase component I' and the quadrature component Q' to quadrature skew error correction based on quadrature skew error information ψ output from the quadrature skew error detecting section 50, and outputs a quadrature skew-corrected in-phase component I" and quadrature component Q". The quadrature skew error detecting section 50 obtains quadrature skew error information ψ for the in-phase component I" and the quadrature component Q", and outputs the quadrature skew error information ψ to the quadrature skew correcting section 60. In other words, the quadrature skew error detecting section 50 and the quadrature skew correcting section 60 perform feedback correction with respect to quadrature skew errors.

Figure 4:
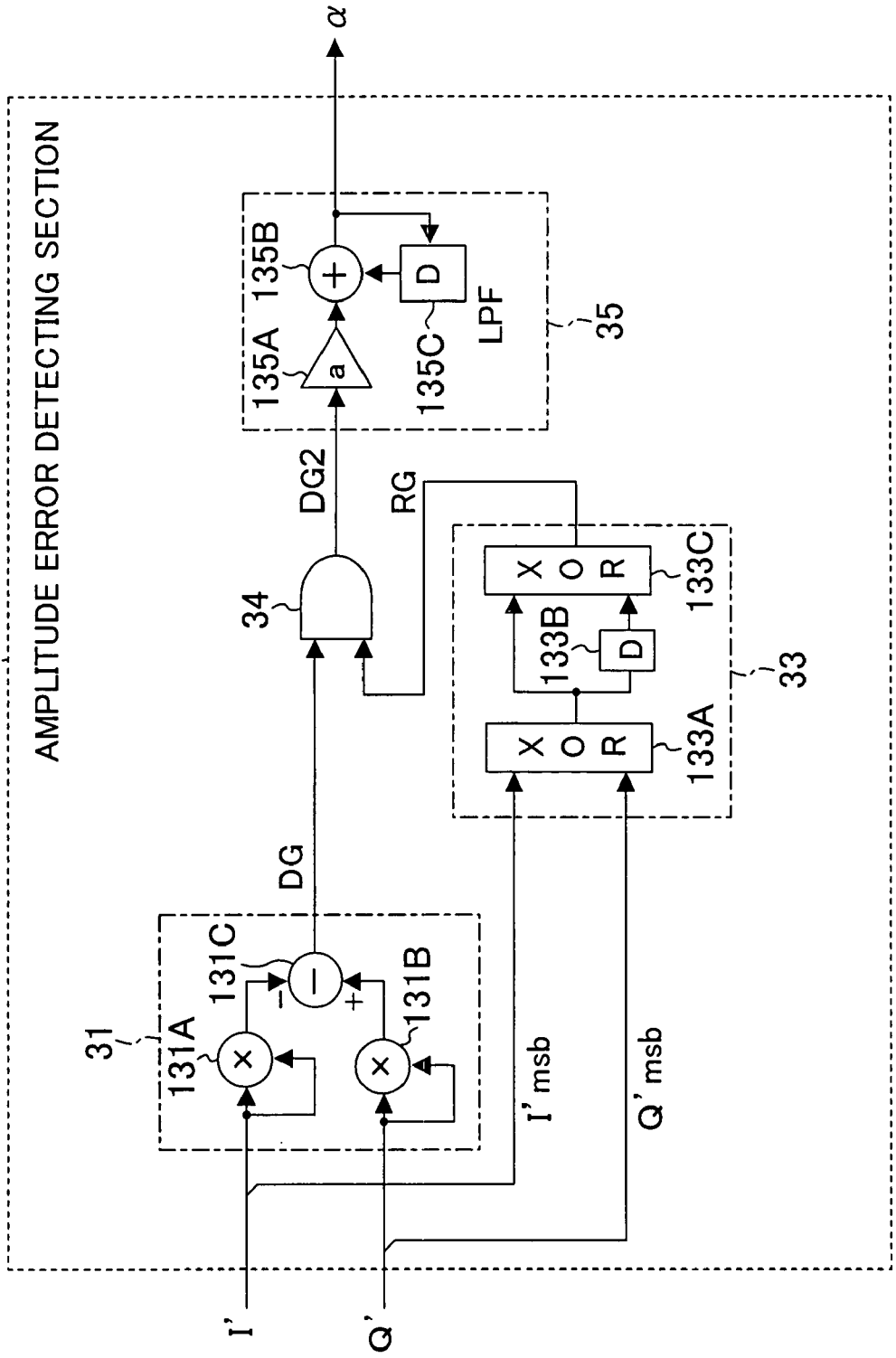
FIG. 4 is a block diagram illustrating an exemplary configuration of an amplitude error detecting section of FIG. 3.

FIG. 4 is a block diagram illustrating an exemplary configuration of the amplitude error detecting section 30 of FIG. 3. The amplitude error detecting section 30 comprises a power difference calculating section 31, a rotation detecting section 33, an error information control section 34, and a low-pass filter (hereinafter referred to as an LPF) 35 as a smoothing section.

The power difference calculating section 31 has multipliers 131A and 131B, and a subtractor 131C. The multiplier 131A squares the in-phase component I' to obtain a power thereof, and outputs the power to the subtractor 131C. The multiplier 131B squares the quadrature component Q' to obtain a power thereof, and outputs the power to the subtractor 131C. The subtractor 131C calculates a difference between the power of the in-phase component I' and the power of the quadrature component Q' (here, the power of the in-phase component I' is subtracted from the power of the quadrature component Q'), and outputs the difference as an IQ power error DG to the error information control section 34.

The rotation detecting section 33 comprises exclusive OR (XOR) operators 133A and 133C, and a D flip-flop 133B. The XOR operator 133A obtains an exclusive OR (quadrant determination signal) of a sign bit (I'msb) of the in-phase component I' and a sign bit (Q' msb) of the quadrature component Q', and outputs the quadrant determination signal to the D flip-flop 133B and the XOR operator 133C. The XOR operator 133A outputs "0" as the quadrant determination signal when a current signal point of the IQ signal is present in the first or third quadrant on the IQ plane, and "1" when the signal point is present in the second or fourth quadrant.

The D flip-flop 133B delays the quadrant determination signal by, for example, one clock and outputs the result to the XOR operator 133C. The XOR operator 133C obtains the exclusive OR of the quadrant determination signal and the quadrant determination signal delayed in the D flip-flop 133B, and outputs the result as a rotation detect signal RG to the error information control section 34. In other words, the rotation detecting section 33 does not detect a rotation of a signal point of the IQ signal and sets the rotation detect signal RG to be "0" when there is not a change in the quadrant determination signal, and detects a rotation of a signal point of the IQ signal and sets the rotation detect signal RG to be "1" when there is a change in the quadrant determination signal.

The error information control section 34 outputs "0" when the rotation detect signal RG is "0", and the IQ power error DG when the rotation detect signal RG is "1", as IQ power error information DG2 to the LPF 35.

The LPF 35 has a gain adjuster 135A, an adder 135B, and a D flip-flop 135C, and is configured as a loop filter. The gain adjuster 135A adjusts a gain of the IQ power error information DG2 and outputs the result to the adder 135B. The adder 135B and the D flip-flop 135C accumulate outputs of the gain adjuster 135A, and output the result as the in-phase amplitude error magnification factor α.

Figure 5:
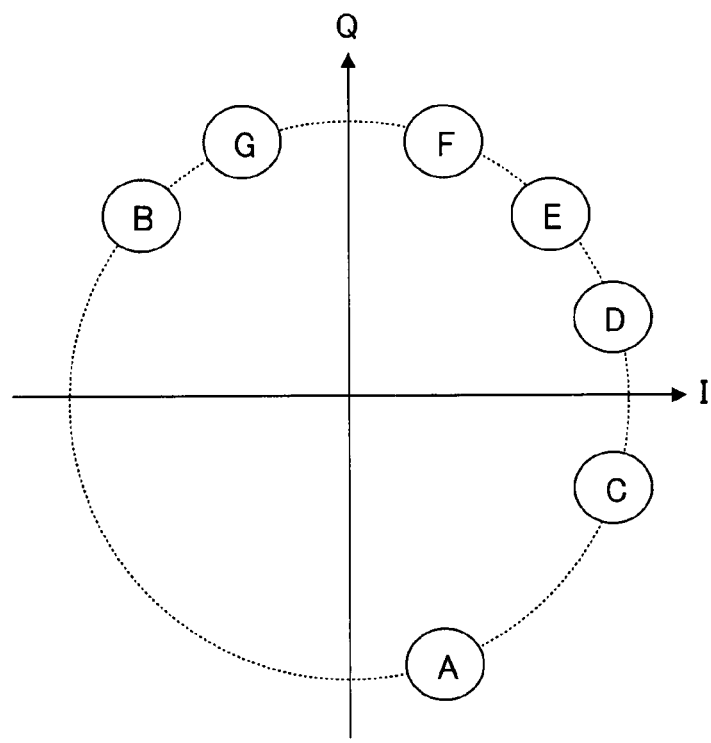
FIG. 5 is a schematic diagram illustrating a distribution of signal points on an IQ plane of an IQ signal obtained by quadrature demodulation when the IQ signal has a frequency offset with respect to carrier waves, during reception of a BPSK-modulated signal.

FIG. 5 is a schematic diagram illustrating a distribution of signal points on an IQ plane of an IQ signal obtained by quadrature demodulation when the IQ signal has a frequency offset with respect to carrier waves, during reception of a BPSK-modulated signal. For example, in the case of FIG. 5, the signal points of the IQ signal transition in the following manner: A→B→C→D→E→F→G.

Here, the rotation detecting section 33 does not detect a rotation of a signal point of an input IQ signal, when the signal point of the IQ signal transitions in the second and fourth quadrants (A→B→C), and when the signal point of the IQ signal transitions in the first and third quadrants (D→E→F). In such a case, the error information control section 34 does not output the IQ power error DG, and outputs 0 to the LPF 35.

Also, the rotation detecting section 33 detects a rotation of a signal point of an IQ signal when the signal point transitions between the second and fourth quadrants and the first and third quadrants (C→D and F→G). In such a case, the error information control section 34 outputs the IQ power error DG to the LPF 35. Specifically, in the case as illustrated in FIG. 5, the amplitude error detecting section 30 performs amplitude error calculation between the in-phase component I' and the quadrature component Q'.

Figure 6:
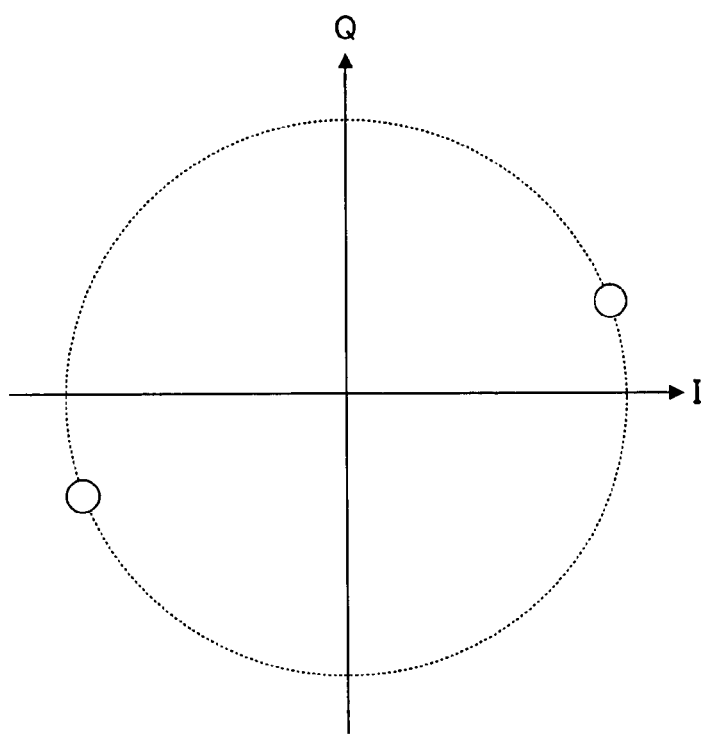
FIG. 6 is a schematic diagram illustrating a distribution of signal points on an IQ plane of an IQ signal obtained by quadrature demodulation when the IQ signal does not have a frequency offset with respect to carrier waves, during reception of a BPSK-modulated signal.

FIG. 6 is a schematic diagram illustrating a distribution of signal points on an IQ plane of an IQ signal obtained by quadrature demodulation when the IQ signal does not have a frequency offset with respect to carrier waves, during reception of a BPSK-modulated signal. For example, in the case of FIG. 6, the signal point on the IQ plane of the IQ signal transitions only in the second and fourth quadrants (or the first and third quadrants). In this case, the rotation detecting section 33 does not detect a rotation of the signal point, even when the signal point of the IQ signal transitions. In such a case, the error information control section 34 outputs 0 to the LPF 35. Specifically, in the case as illustrated in FIG. 6, the amplitude error detecting section 30 does not perform amplitude error calculation between the in-phase component I' and the quadrature component Q'.

Thus, the amplitude error detecting section 30 detects a rotation of a signal point (an IQ vector) of an IQ signal, and only when a rotation has been detected, performs amplitude error calculation between the in-phase component I' and the quadrature component Q'. Thereby, even when the distribution of signal points of an IQ signal is not uniform as illustrated in FIG. 6 (e.g., a quadrature-demodulated IQ signal has a frequency offset of 0), it is possible to avoid erroneous detection of an amplitude error.

Note that a block for determining whether or not an IQ signal is a BPSK-modulated signal may be provided, and based on the result of the determination, the error information control section 34 may control the IQ power error information DG2. Also, since the detection section 16 typically determines whether or not an IQ signal is a BPSK-modulated signal, the result of the determination may be used.

Figure 7:
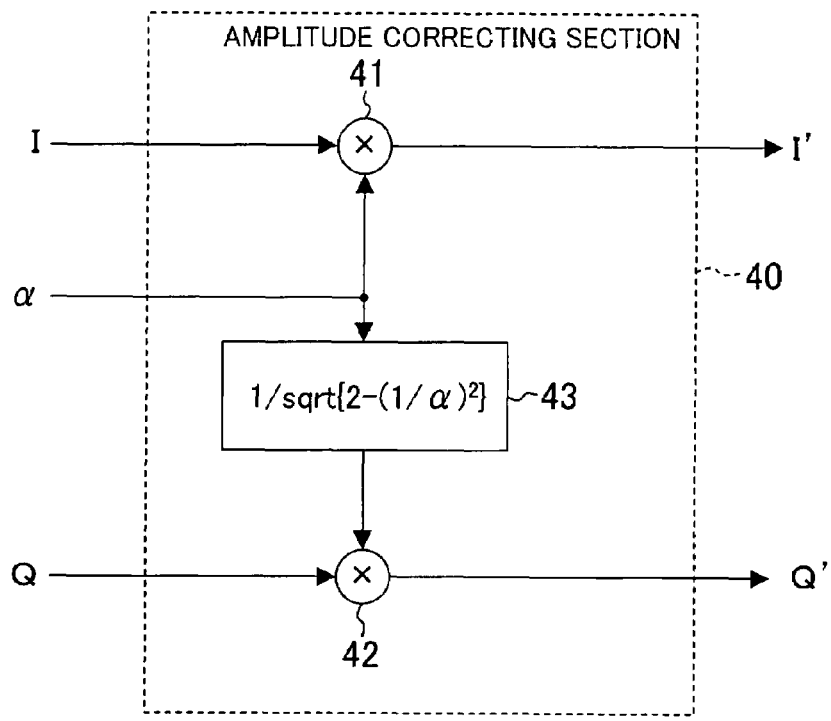
FIG. 7 is a block diagram illustrating an exemplary configuration of an amplitude correcting section of FIG. 3.

FIG. 7 is a block diagram illustrating an exemplary configuration of the amplitude correcting section 40 of FIG. 3. The amplitude correcting section 40 has multipliers 41 and 42, and a quadrature amplitude error magnification factor calculating section 43. The quadrature amplitude error magnification factor calculating section 43 calculates a quadrature amplitude error magnification factor β based on the in-phase amplitude error magnification factor α output from the amplitude error detecting section 30.

The multiplier 41 multiplies the in-phase component I by the in-phase amplitude error magnification factor α, and outputs the result as the in-phase component I'. The multiplier 42 multiplies the quadrature component Q by the quadrature amplitude error magnification factor β, and outputs the result as the quadrature component Q'. Here, the quadrature amplitude error magnification factor calculating section 43 calculates the quadrature amplitude error magnification factor β so that the powers of the in-phase component I and the quadrature component Q input to the amplitude correcting section 40 are equal to the powers of the in-phase component I' and the quadrature component Q' output from the amplitude correcting section 40.

Figure 8:
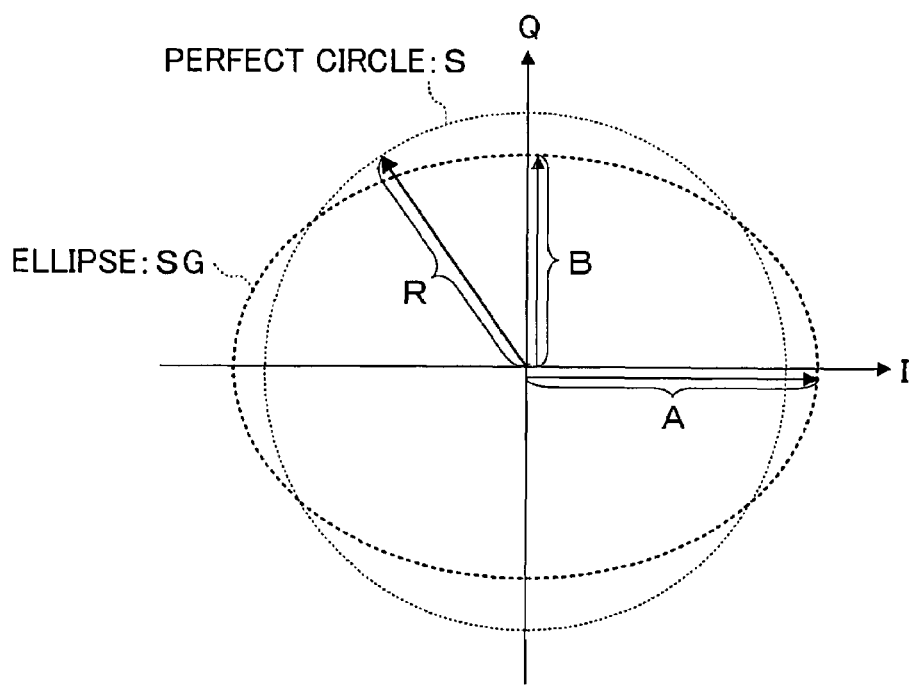
FIG. 8 is a diagram schematically illustrating average amplitudes of an IQ signal as a locus on an IQ plane when there is an amplitude error between an in-phase component and a quadrature component.

FIG. 8 is a diagram schematically illustrating average amplitudes of an IQ signal as a locus on an IQ plane when there is an amplitude error between an in-phase component and a quadrature component. A method of calculating the quadrature amplitude error magnification factor β will be described in detail.

When there is an amplitude error between the in-phase component I and the quadrature component Q, average amplitudes of an IQ signal having these as components thereof are represented by an ellipse SG of FIG. 8. Assuming that the in-phase component I' and the quadrature component Q' after amplitude correction have the same amplitude, average amplitudes of an IQ signal having these as components thereof are represented by a perfect circle S of FIG. 8. Here, the major radius and the minor radius of the ellipse SG are represented by A and B, respectively, and the radius of the perfect circle S is represented by R.

Initially, the perfect circle S is represented by polar coordinates (i.e., I=R sin θ and Q=R cos θ). Assuming that the average amplitude of an IQ signal having the in-phase component I' and the quadrature component Q' as components thereof has a uniform probability distribution at θ=0 to 2π, the average power of the IQ signal is obtained by:

$$\int [0 \to 2\pi] R^2 (\sin^2\theta + \cos^2\theta) d\theta / 2\pi = R^2 \qquad (1)$$

where $\int [0 \to 2\pi] d\theta$ represents an integral from θ=0 to θ=2π.

Next, the ellipse SG is represented by polar coordinates (i.e., I=A sin θ and Q=B cos θ). Assuming the average amplitude of an IQ signal having the in-phase component I and the quadrature component Q as components thereof has a uniform probability distribution at θ=0 to 2π, the average power of the IQ signal is calculated by:

$$\int [0 \to 2\pi] (A^2 \sin^2\theta + B^2 \cos^2\theta) d\theta / 2\pi = (A^2 + B^2)/2 \qquad (2).$$

Here, by adding a condition that the powers before and after correction are the same, the following equation is obtained from equations (1) and (2):

$$A^2 + B^2 = 2R^2 \qquad (3).$$

The amplitude correcting section 40 multiplies the in-phase component I by the in-phase amplitude error magnification factor α, and the quadrature component Q by the quadrature amplitude error magnification factor β, to perform amplitude correction. Since the average amplitudes of signals before and after correction are equal to each other, the average amplitudes A and B before correction and the average amplitude R after correction have relationships represented by:

$$\alpha A = R \qquad (4)$$

$$\beta B = R \qquad (5).$$

When equations (4) and (5) are substituted into equation (3), β is represented, using α, by:

$$\beta = 1/\text{sqrt}\{2 - (1/\alpha)^2\} \qquad (6).$$

The quadrature amplitude error magnification factor calculating section 43 calculates the quadrature amplitude error magnification factor β from the in-phase amplitude error magnification factor α using the relationship of equation (6). The quadrature amplitude error magnification factor calculating section 43 can be implemented as, for example, a ROM (read-only memory) storing a look-up table representing the relationship of equation (6).

As described above, the amplitude correcting section 40 adjusts the gains of the in-phase component I and the quadrature component Q under the condition that the average powers before and after correction are the same and based on the in-phase amplitude error magnification factor α, which is a scalar.

Although it has been described that the quadrature amplitude error magnification factor β is obtained from the in-phase amplitude error magnification factor α, the quadrature amplitude error magnification factor β may be obtained in the amplitude error detecting section, and then the in-phase amplitude error magnification factor α may be obtained using equation (6).

Figure 9:
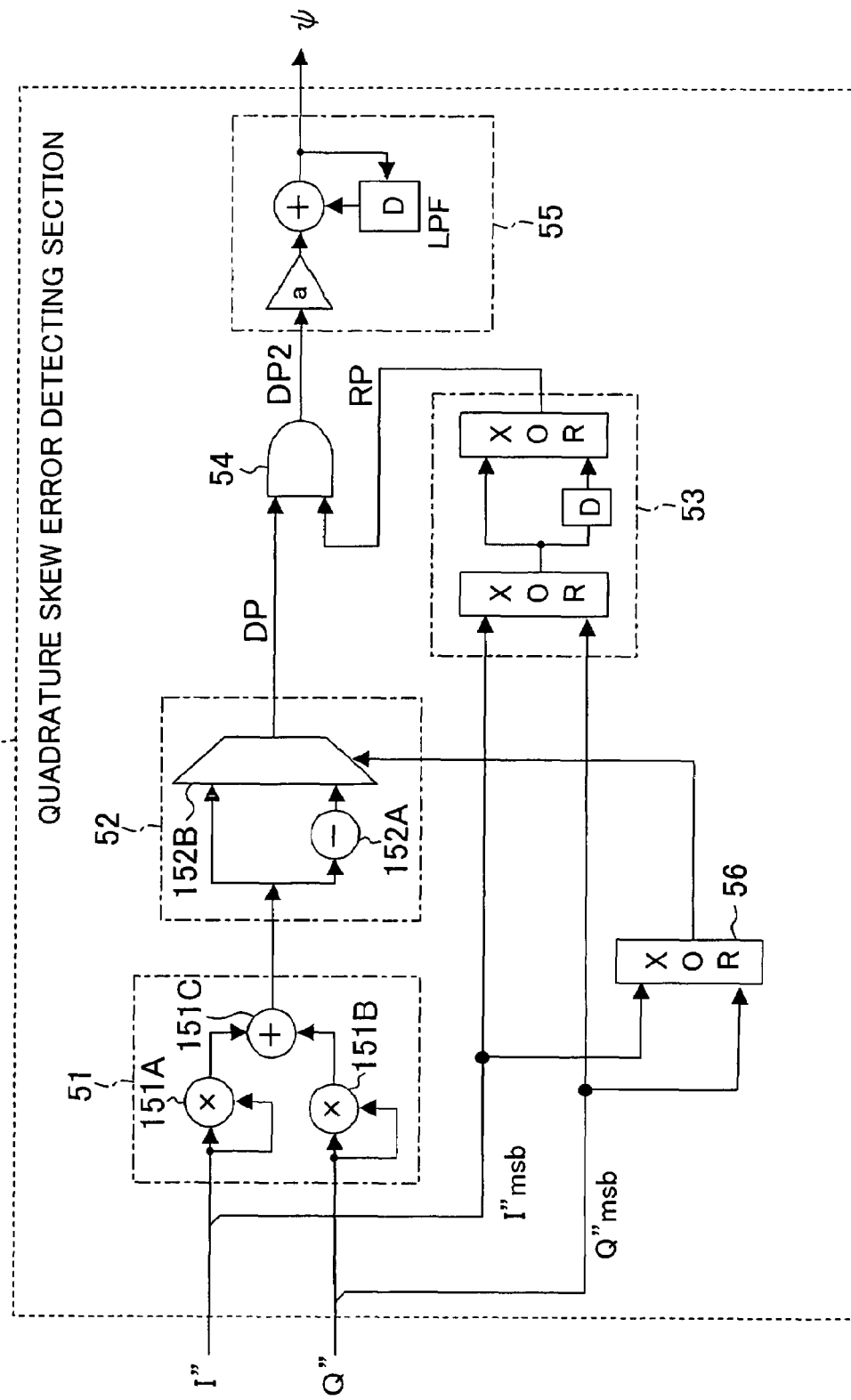
FIG. 9 is a block diagram illustrating an exemplary configuration of a quadrature skew error detecting section of FIG. 3.

FIG. 9 is a block diagram illustrating an exemplary configuration of the quadrature skew error detecting section 50 of FIG. 3. The quadrature skew error detecting section 50 comprises a power calculating section 51, a sign determining section 52, a rotation detecting section 53, an error information control section 54, an LPF 55 as a smoothing section, and a quadrant determining section 56.

The power calculating section 51 has multipliers 151A and 151B, and an adder 151C. The multiplier 151A squares the in-phase component I" to obtain a power thereof, and outputs the power to the adder 151C. The multiplier 151B squares the quadrature component Q" to obtain a power thereof, and outputs the power to the adder 151C. The adder 151C calculates the sum of the power of the in-phase component I" and the power of the quadrature component Q", and outputs a resultant value as a power P to the sign determining section 52.

The sign determining section 52 has a sign inverter 152A and a selector 152B. The sign inverter 152A inverts the sign of the power P and outputs the result to the selector 152B. The selector 152B selects the power P when the quadrant determination signal output from the quadrant determining section 56 is "0", and the power P whose sign has been inverted by the sign inverter 152A when the quadrant determination signal is "1", and outputs the selected value as a quadrant power error DP to the error information control section 54.

The quadrant determining section 56 obtains the exclusive OR of a sign bit (I"msb) of the in-phase component I" and a sign bit (Q"msb) of the quadrature component Q", which are output from the quadrature skew correcting section 60, and outputs the result as a quadrant determination signal to the selector 152B. The quadrant determination signal is "0" when a signal point represented by the in-phase component I" and the quadrature component Q" is present in the first or third quadrant on an IQ plane, and "1" when the signal point is present in the second or fourth quadrant.

The rotation detecting section 53 has the same configuration as that of the rotation detecting section 33 of FIG. 4, and obtains a rotation detect signal RP based on the sign bit (I"msb) of the in-phase component I" and the sign bit (Q"msb) of the quadrature component Q" and outputs the result to the error information control section 54.

The error information control section 54 outputs "0" when the rotation detect signal RP is "0", and the quadrant power error DP when the rotation detect signal RP is "1", as quadrant power error information DP2 to the LPF 55. The LPF 55 has the same configuration as that of the LPF 35 of FIG. 4, and accumulates the quadrant power error information DP2 after gain adjustment, and outputs resultant quadrature skew error information ψ.

During reception of a BPSK-modulated signal, when an IQ signal obtained by quadrature demodulation has a frequency offset, signal points of the IQ signal transition as illustrated in FIG. 5 (A→B→C→D→E→F→G). As is similar to the rotation detecting section 33 of FIG. 4, the rotation detecting section 53 does not detect a rotation of signal points of an input IQ signal, when the signal points of the IQ signal transition in the second and fourth quadrants (A→B→C), and when the signal points of the IQ signal transition in the first and third quadrants (D→E→F). In this case, the error information control section 54 outputs 0.

Also, the rotation detecting section 53 detects a rotation of signal points of an IQ signal when the signal points transition between the second and fourth quadrants and the first and third quadrants (C→D and F→G). In this case, the error information control section 54 outputs the quadrant power error DP. Specifically, in the case as illustrated in FIG. 5, the quadrature skew error detecting section 50 performs quadrature skew error calculation between the in-phase component I" and the quadrature component Q".

During reception of a BPSK-modulated signal, when an IQ signal obtained by quadrature demodulation does not have a frequency offset, signal points on an IQ plane of the IQ signal transition only in the second and fourth quadrants (or the first and third quadrants) as illustrated in FIG. 6. In this case, the rotation detecting section 53 does not detect a rotation of the signal points, even when the signal points of the IQ signal transition. In this case, the error information control section 54 outputs 0. In other words, as in the case as illustrated in FIG. 6, the quadrature skew error detecting section 50 does not perform quadrature skew error calculation between the in-phase component I" and the quadrature component Q".

Thus, the quadrature skew error detecting section 50 detects a rotation of signal points (IQ vectors) of an IQ signal, and only when a rotation has been detected, performs quadrature skew error calculation between the in-phase component I" and the quadrature component Q". Thereby, even when the distribution of signal points of an IQ signal is not uniform (e.g., in the case where an IQ signal obtained by quadrature demodulation has a frequency offset of 0) as illustrated in FIG. 6, it is possible to avoid erroneous detection of a quadrature skew error.

Note that a block for determining whether or not an IQ signal is a BPSK-modulated signal may be provided, and based on the result of the determination, the error information control section 54 may control the quadrant power error information DP2. Also, since the detection section 16 typically determines whether or not an IQ signal is a BPSK-modulated signal, the result of the determination may be used.

Figure 10:
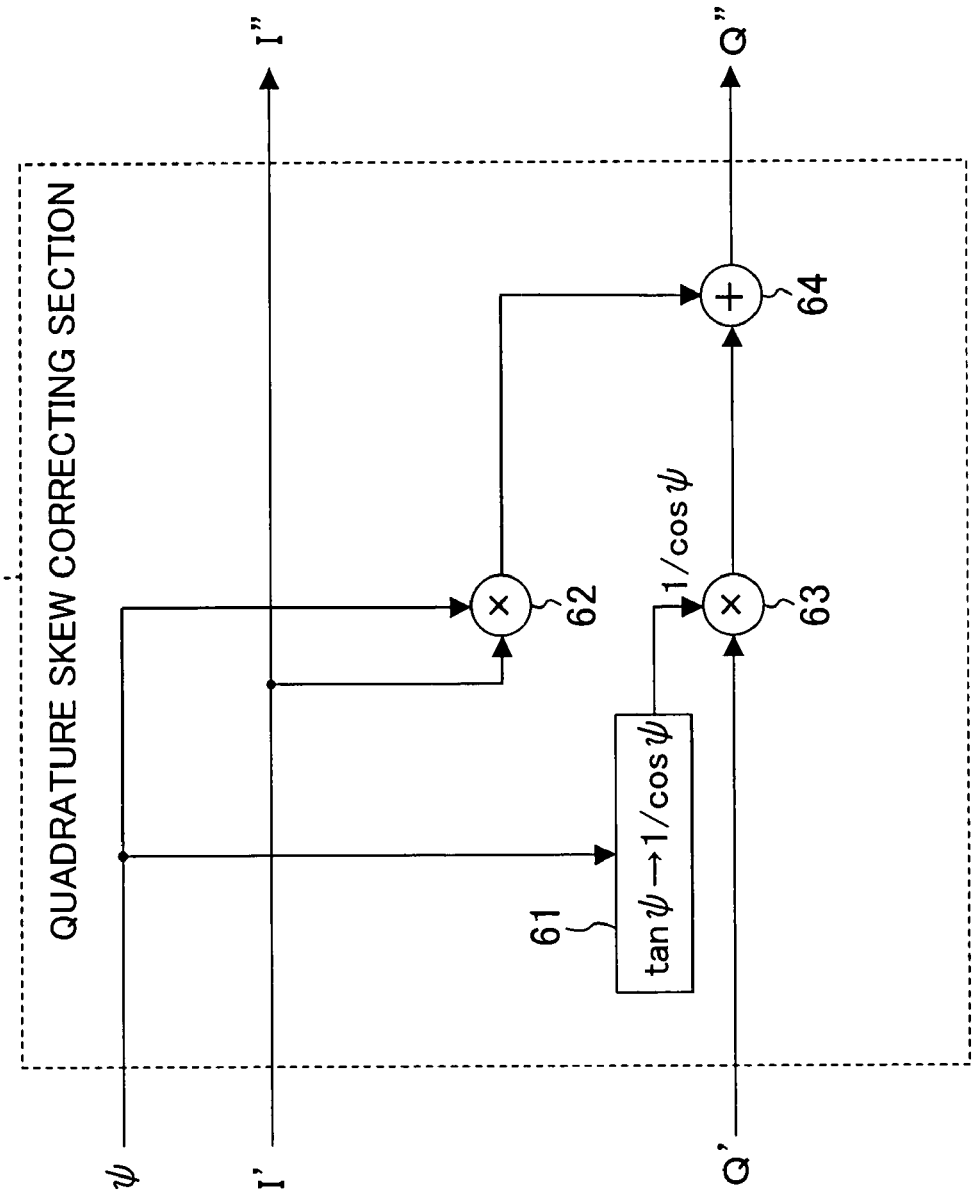
FIG. 10 is a block diagram illustrating an exemplary configuration of a quadrature skew correcting section of FIG. 3.

FIG. 10 is a block diagram illustrating an exemplary configuration of the quadrature skew correcting section 60 of FIG. 3. The quadrature skew correcting section 60 comprises a conversion ROM 61, multipliers 62 and 63, and an adder 64. The quadrature skew correcting section 60 handles the quadrature skew error information ψ (deviation of quadrature skew) output from the quadrature skew error detecting section 50, as tan ψ, since ψ is sufficiently small.

The conversion ROM 61 converts the quadrature skew error information tan ψ into 1/cos ψ, which is in turn output. The multiplier 63 multiplies 1/cos ψ output from the conversion ROM 61 by the quadrature component Q', and outputs the result of the multiplication to the adder 64. The multiplier 62 multiplies the in-phase component I' by the quadrature skew error information tanψ, and outputs the result of the multiplication to the adder 64. The adder 64 adds the results of the multiplication obtained in the multipliers 62 and 63, and outputs the corrected quadrature component Q".

Next, an operation of the quadrature skew correcting section 60 will be described in detail. Since the preceding amplitude correcting section 40 has performed amplitude correction with respect to the in-phase component I and the quadrature component Q, the in-phase component I' and the quadrature component Q' after amplitude correction have the same amplitude. The in-phase component I' and the quadrature component Q' are represented, respectively, by:

$$I'=A\cos\{(2\pi\times\Delta f\times t)+\phi+\theta(t)\} \quad (7)$$

$$Q'=A\sin\{(2\pi\times\Delta f\times t)+\phi+\theta(t)+\psi\} \quad (8)$$

where

Δf: frequency offset [Hz]

φ: phase offset [rad], θ(t): phase information [rad]

ψ: quadrature skew error information [rad], t: time [s]

A: amplitudes of the in-phase component and the quadrature component.

When the quadrature skew error information ψ of the quadrature component Q' is corrected, the quadrature component Q" after quadrature skew error correction is represented by:

$$Q''=I'\times\tan\psi+Q'\times1/\cos\psi \quad (9)$$

$$=A\cos\omega t\times\tan\psi+A\sin(\omega t+\psi)\times1/\cos\psi$$

$$=A\cos\omega t\times\tan\psi+\{A\sin\omega t\cos\psi-A\cos\omega t\sin\psi\}\times1/\cos\psi$$

$$=A\cos\omega t\times\tan\psi+A\sin\omega t-A\cos\omega t\times\tan\psi$$

$$=A\sin\omega t \quad (9)$$

where the phase offset φ and the phase information θ are assumed to be 0 for the sake of simplicity, and ω=2π×Δf.

Thus, the quadrature skew correcting section 60 receives the in-phase component I' and the quadrature component Q' and performs the calculation of equation (9), thereby making it possible to correct the quadrature skew error information ψ of the quadrature component Q', and output the corrected quadrature component Q".

As described above, according to the amplitude/quadrature skew error compensating section of FIG. 3, for example, during reception of a BPSK-modulated signal, even when an IQ signal obtained by quadrature demodulation does not have a frequency offset with respect to carrier waves, amplitude/quadrature skew error correction can be correctly performed without a malfunction. Also, the amplitude/quadrature skew error compensating section can be implemented as a circuit having a small area, and amplitude/quadrature skew error correction can be performed without a change in signal power between before and after correction.

Second Embodiment

Figure 11:
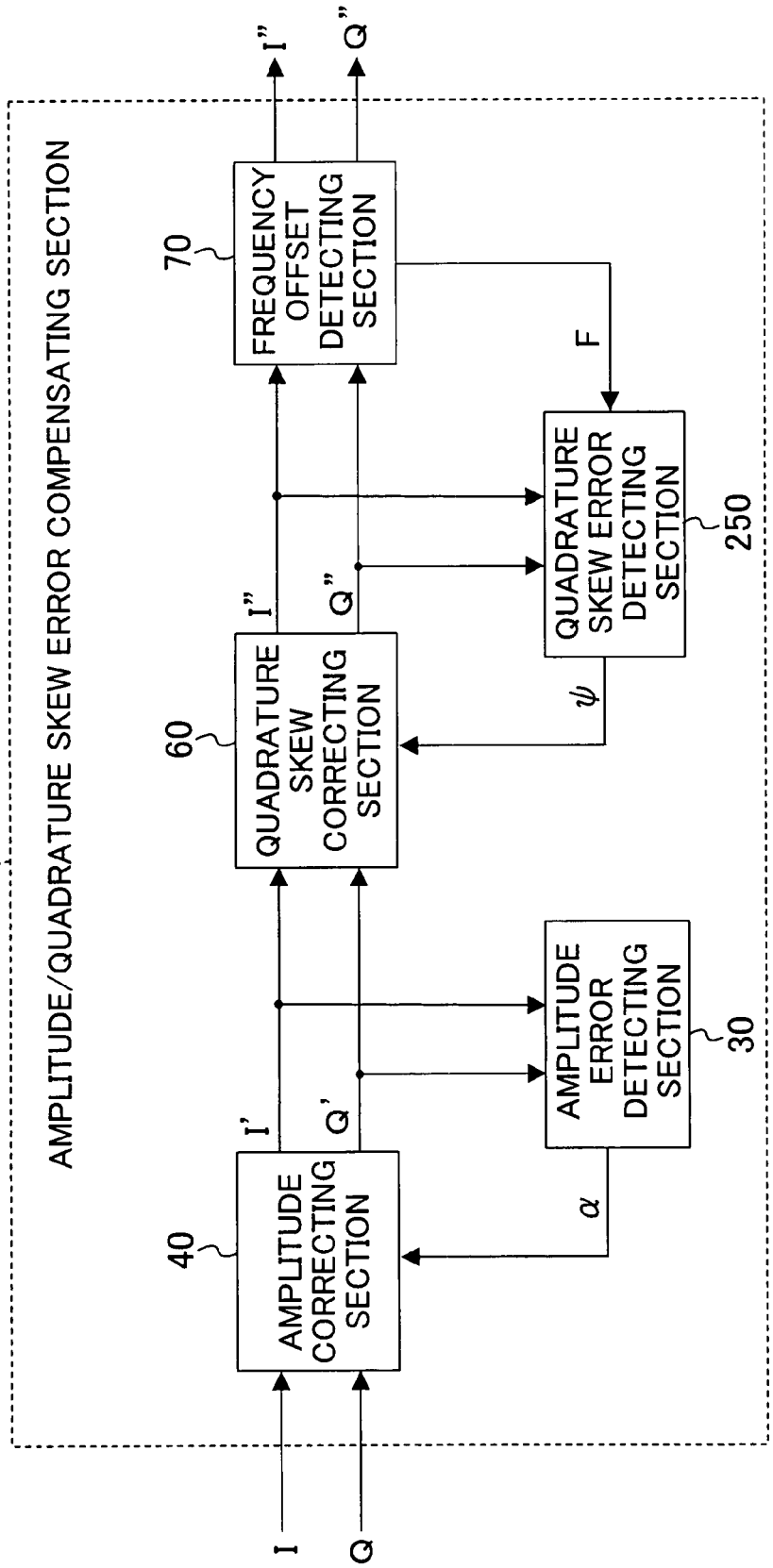
FIG. 11 is a block diagram illustrating an exemplary configuration of an amplitude/quadrature skew error compensating section according to a second embodiment of the present invention.

FIG. 11 is a block diagram illustrating an exemplary configuration of an amplitude/quadrature skew error compensating section 215 according to a second embodiment of the present invention. The amplitude/quadrature skew error compensating section 215 is used in place of the amplitude/quadrature skew error compensating section 15 in the demodulation device of FIG. 1. The amplitude/quadrature skew error compensating section 215 of FIG. 11 comprises a quadrature skew error detecting section 250 in place of the quadrature skew error detecting section 50, and further comprises a frequency offset detector 70, in the amplitude/quadrature skew error compensating section 15 of FIG. 3. The other parts are the same as those which have been described in the first embodiment, and are indicated by the same reference numerals and will not be described.

The frequency offset detector 70 detects a frequency offset with respect to carrier waves from an IQ signal output from the quadrature skew correcting section 60, and outputs "1" when the value of the detected frequency offset is larger than a previously set threshold value σ, and "0" when the value is smaller than the threshold value σ, as a control signal F to the quadrature skew error detecting section 250.

Figure 12:
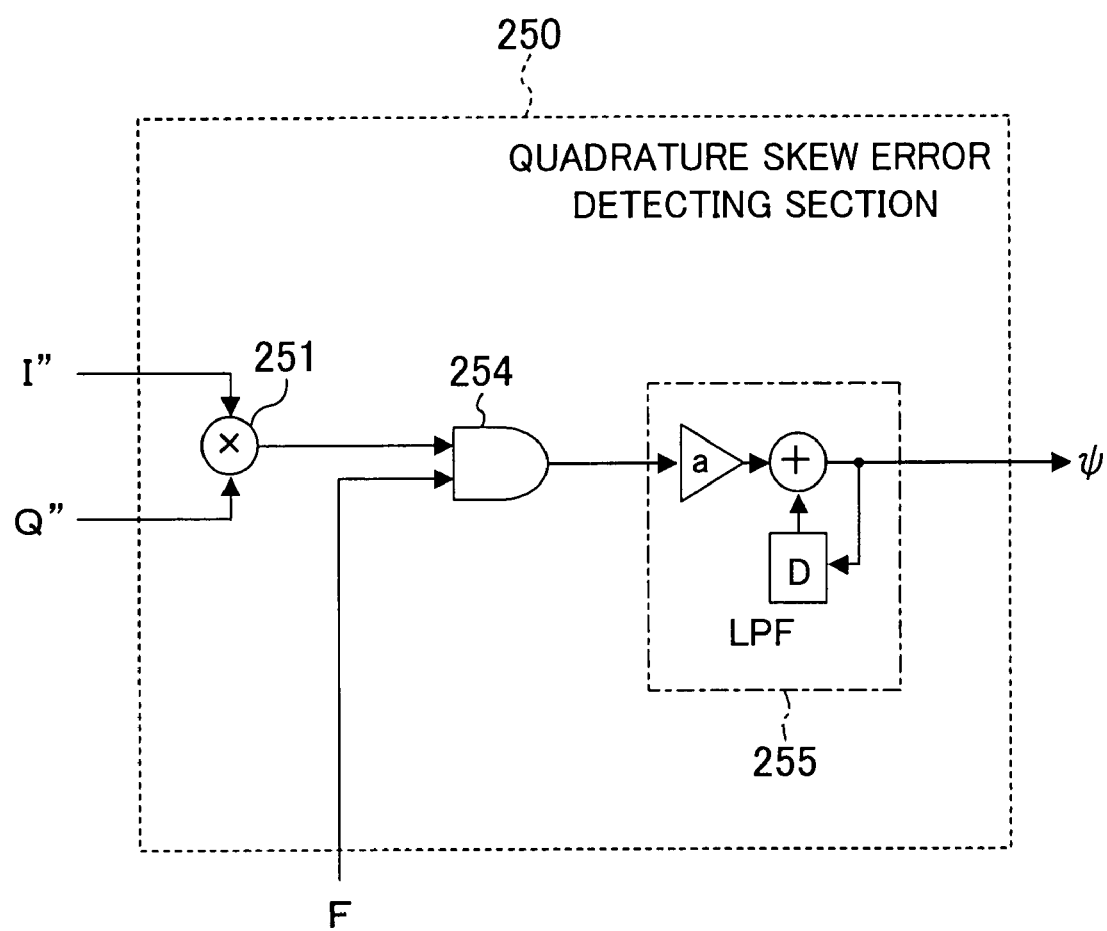
FIG. 12 is a block diagram illustrating an exemplary configuration of a quadrature skew error detecting section of FIG. 11.

FIG. 12 is a block diagram illustrating an exemplary configuration of the quadrature skew error detecting section 250 of FIG. 11. The quadrature skew error detecting section 250 has a multiplier 251, an error information control section 254, and an LPF 255. The multiplier 251 multiplies the in-phase component I" and the quadrature component Q" of an IQ signal output from the quadrature skew correcting section 60, and outputs the result of the multiplication to the error information control section 254. The error information control section 254 outputs 0 when the control signal F output from the frequency offset detector 70 is "0", and the result of the multiplication in the multiplier 251 when the control signal F is "1", to the LPF 255. The LPF 255 has the same configuration as that of the LPF 35 of FIG. 4, and accumulates the output of the error information control section 254 after gain adjustment, and outputs a resultant quadrature skew error information ψ.

Next, an operation of the multiplier 251 will be described in detail. When quadrature skew error correction has not been completed, the in-phase component I" and the quadrature component Q" are represented, as in equations (7) and (8), by:

$$I''=A\cos\{(2\pi \times \Delta f \times t)+\phi+\theta(t)\} \quad (10)$$

$$Q'=A\sin\{(2\pi \times \Delta f \times t)+\phi+\theta(t)+\psi\} \quad (11).$$

According to the product-to-sum formulas, the result of the multiplication of the in-phase component I" and the quadrature component Q" is represented, using equations (10) and (11), by:

$$I'' * Q'' = A\cos\{(2\pi \times \Delta f \times t) + \phi + \theta(t)\} \times \quad (12)$$
$$A\sin\{(2\pi \times \Delta f \times t) + \phi + \theta(t) + \psi\}$$
$$= A^2/2 \times \sin\{(4\pi \times \Delta f \times t) + 2\phi + 2\theta(t) + \psi\} +$$
$$A^2/2 \times \sin\{\psi\}.$$

Here, assuming equation (12) is integrated over a sufficiently long time, $$\int [0 \to \infty] I'' * Q'' dt = \int [0 \to \infty] A^2/2 \times \sin\{(4\pi \times \Delta f \times t) + \quad (13)$$
$$2\phi + 2\theta(t) + \psi\} dt +$$
$$\int [0 \to \infty] A^2/2 \times \sin\{\psi\} dt.$$

When there is a frequency offset Δf, the first term of equation (13) is 0, and only the second term (quadrature skew error component) can be detected.

Thus, when the frequency offset is larger than the previously set threshold value σ, the quadrature skew error detecting section 250 can obtain the quadrature skew error information ψ by calculating an integral of the result of multiplication of the in-phase component I" by the quadrature component Q" using the LPF 255. In other words, according to the quadrature skew error detecting section 250, a simple circuit can be used to perform quadrature skew error detection while suppressing the circuit scale.

Note that, when the input signal is a digital phase-modulated signal (QPSK signal, etc.) other than BPSK signals, the output of the multiplier 251 may be directly input to the LPF 255 without using the error information control section 254, so as to perform quadrature skew error detection.

Also, a block for determining whether or not an IQ signal is a BPSK-modulated signal may be provided, and based on the result of the determination, the error information control section 254 may be controlled. Also, since the detection section 16 typically determines whether or not an IQ signal is a BPSK-modulated signal, the result of the determination may be used.

Third Embodiment

Figure 13:
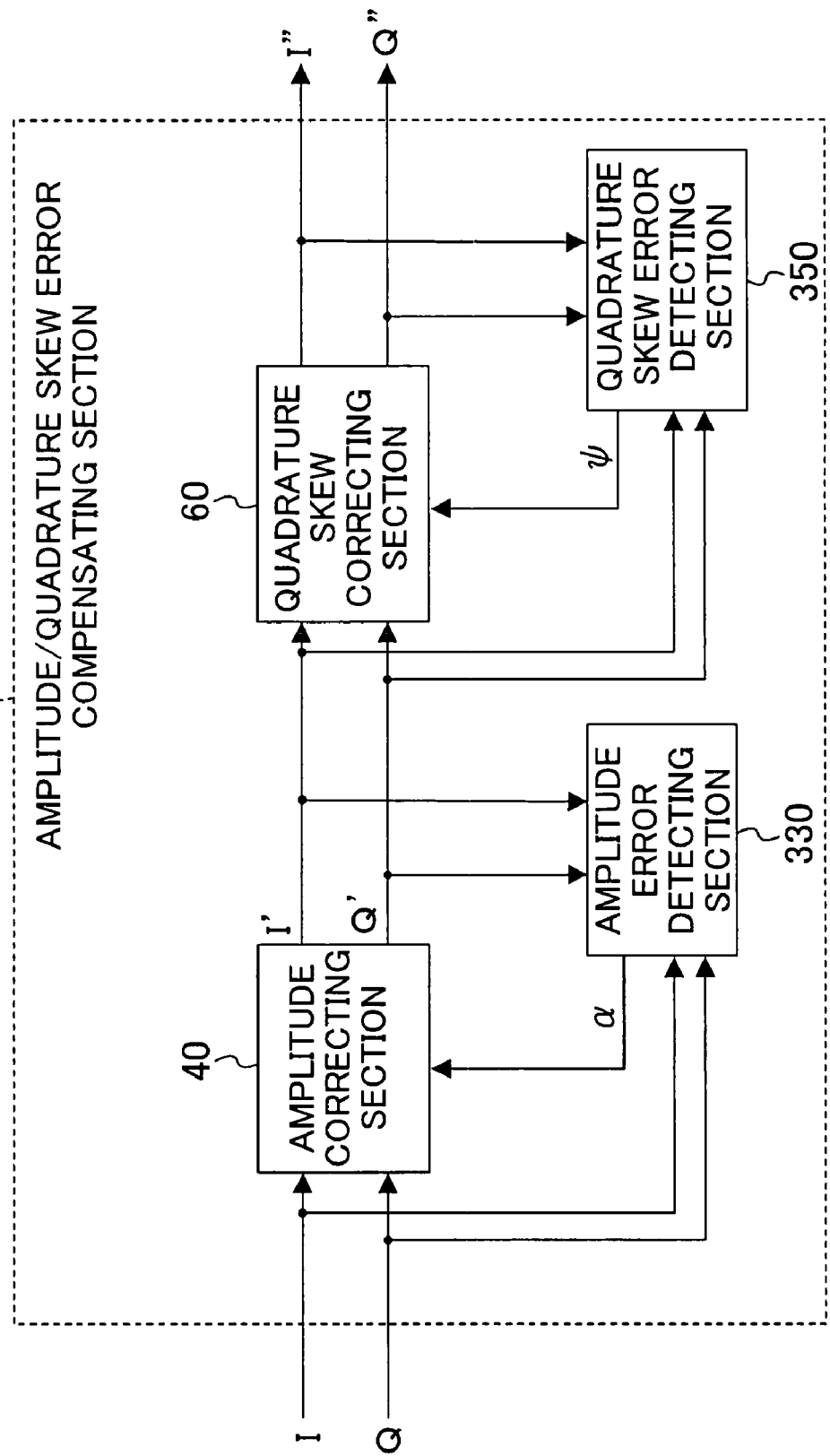
FIG. 13 is a block diagram illustrating an exemplary configuration of an amplitude/quadrature skew error compensating section according to a third embodiment of the present invention.

FIG. 13 is a block diagram illustrating an exemplary configuration of an amplitude/quadrature skew error compensating section 315 according to a third embodiment of the present invention. The amplitude/quadrature skew error compensating section 315 is used in place of the amplitude/quadrature skew error compensating section 15 in the demodulation device of FIG. 1. The amplitude/quadrature skew error compensating section 315 of FIG. 13 comprises an amplitude error detecting section 330 and a quadrature skew error detecting section 350 in place of the amplitude error detecting section 30 and the quadrature skew error detecting section 50, respectively, in the amplitude/quadrature skew error compensating section 15 of FIG. 3. The other parts are the same as those which have been described in the first embodiment, and are indicated by the same reference numerals and will not be described.

Figure 14:
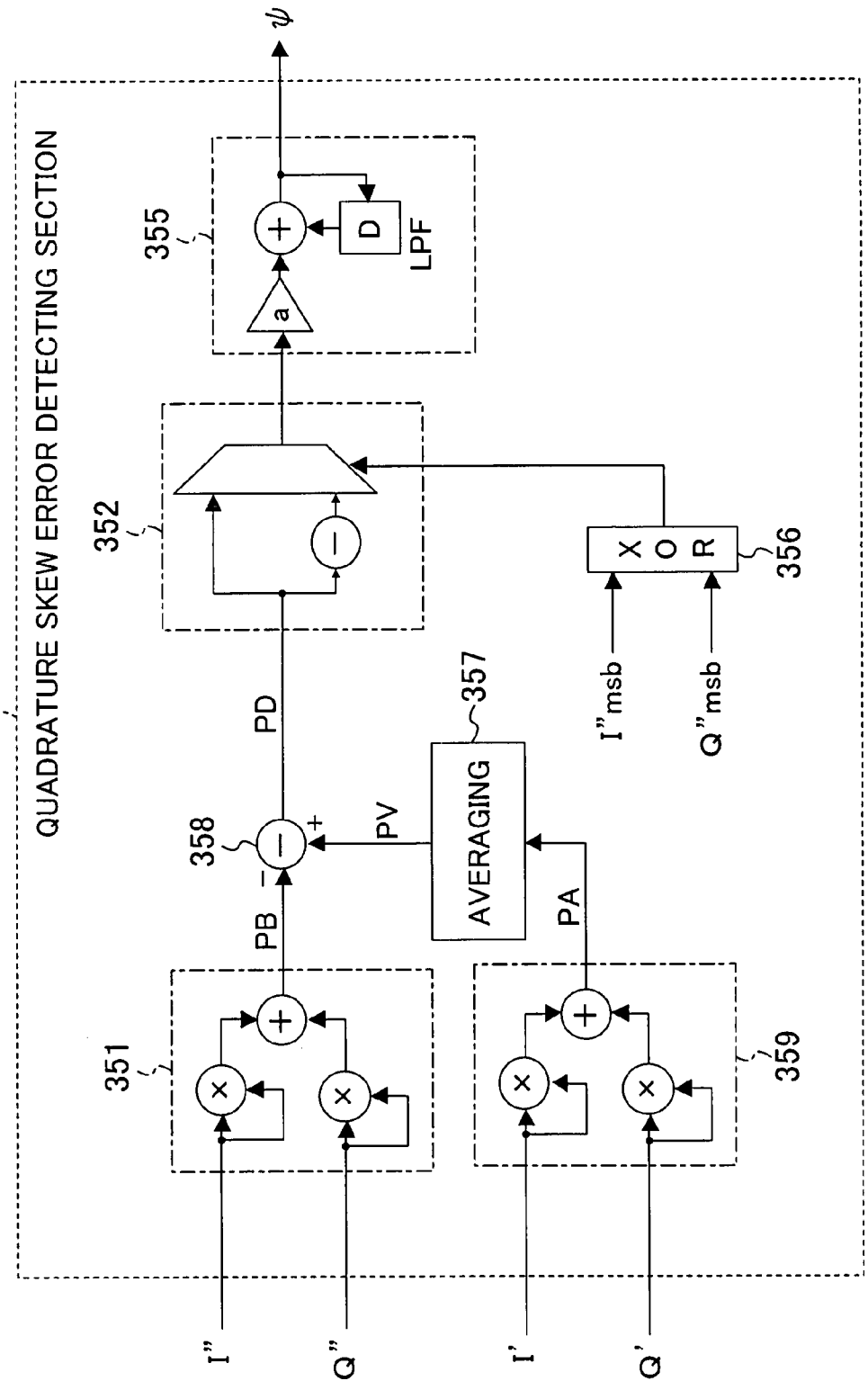
FIG. 14 is a block diagram illustrating an exemplary configuration of a quadrature skew error detecting section of FIG. 13.

FIG. 14 is a block diagram illustrating an exemplary configuration of the quadrature skew error detecting section 350 of FIG. 13. The quadrature skew error detecting section 350 comprises power calculating sections 351 and 359, a sign determining section 352, an LPF 355, a quadrant determining section 356, an averager 357, and a subtractor 358.

The power calculating sections 351 and 359 have the same configuration as that of the power calculating section 51 of FIG. 9. The power calculating section 359 obtains and adds power values of the in-phase component I' and the quadrature component Q', and outputs the result as a power value PA to the averager 357. The averager 357 averages the power value PA, and outputs a resultant average power PV to the subtractor 358. The power calculating section 351 obtains and adds power values of the in-phase component I" and the quadrature component Q", and outputs the result as a power value PB to the subtractor 358. The subtractor 358 subtracts the power value PB from the average power PV, and outputs the result as a power difference PD to the sign determining section 352.

The quadrant determining section 356 obtains the exclusive OR of a sign bit of the in-phase component I" and a sign bit of the quadrature component Q", and outputs the result as a quadrant determination signal to the sign determining section 352. The sign determining section 352 has substantially the same configuration as that of the sign determining section 52 of FIG. 9. The sign determining section 352 selects the power difference PD when the quadrant determination signal output from the quadrant determining section 356 is "1", and the power difference PD whose sign has been inverted when the quadrant determination signal is "0", and outputs the selected value to the LPF 355. The LPF 355 has the same configuration as that of LPF 35 of FIG. 4, and accumulates the output of the sign determining section 352 after gain adjustment, and outputs a resultant quadrature skew error information ψ.

Figure 15:
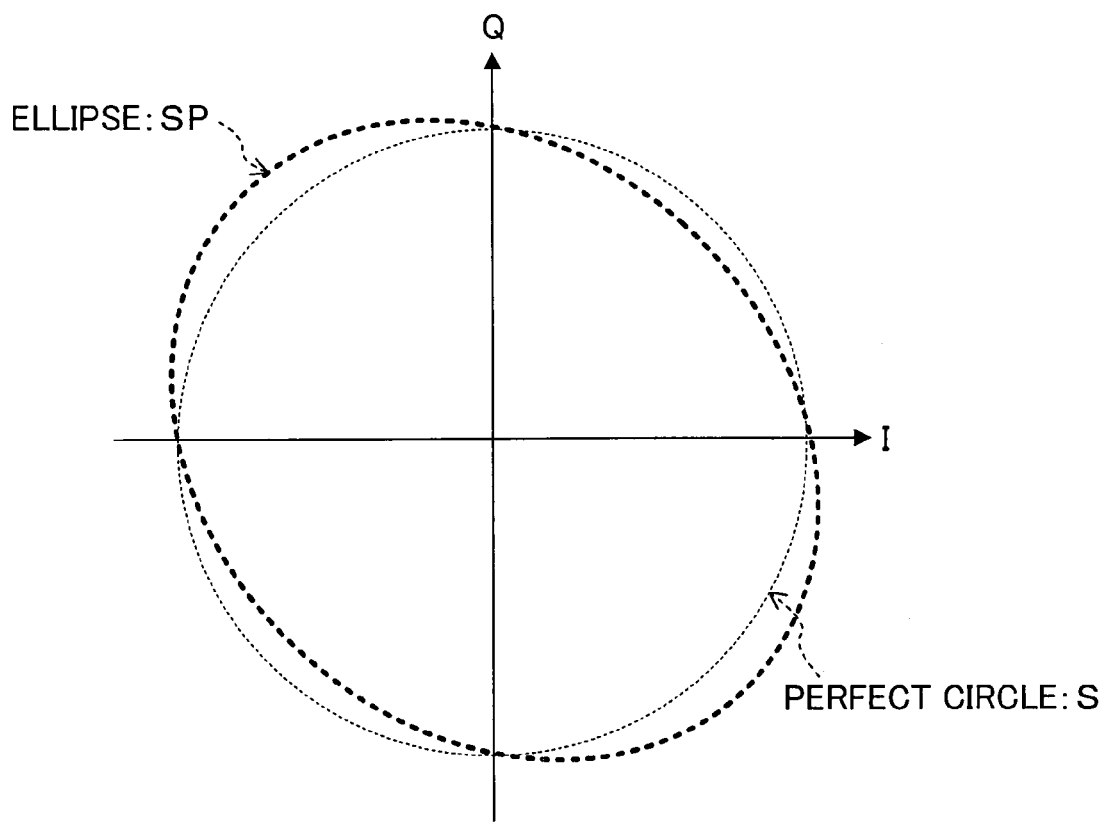
FIG. 15 is a diagram schematically illustrating exemplary average amplitudes of an IQ signal as a locus on an IQ plane when there is a quadrature skew error between an in-phase component and a quadrature component.

FIG. 15 is a diagram schematically illustrating exemplary average amplitudes of an IQ signal as a locus on an IQ plane when there is a quadrature skew error between an in-phase component and a quadrature component. When a phase difference between the in-phase component I" and the quadrature component Q" is larger than 90 degrees, average amplitudes of an IQ signal having these as components thereof are represented by an ellipse SP of FIG. 15. The radius of the perfect circle S is the square root of the average power PV of the IQ signal.

Figure 16:
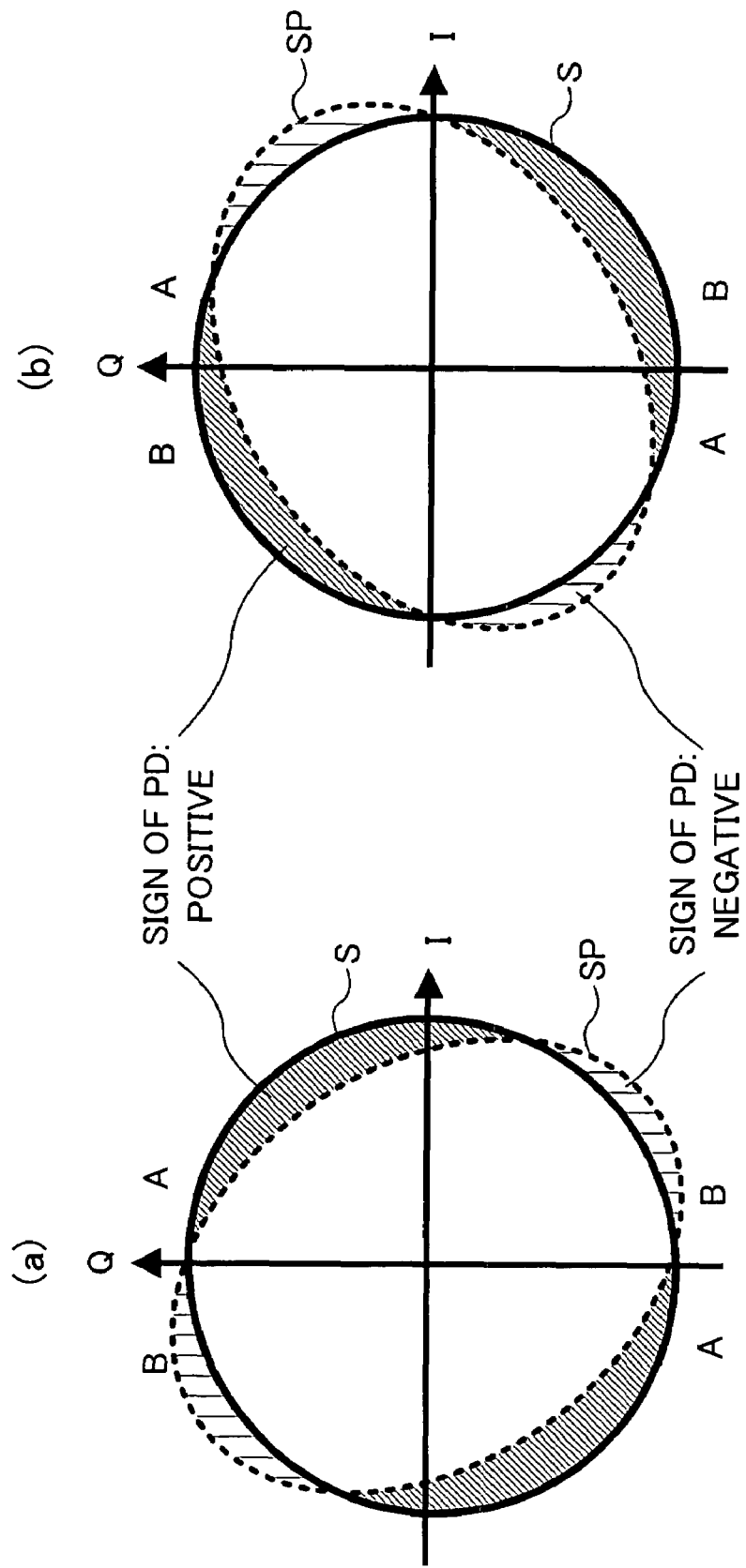
FIG. 16 is a schematic diagram illustrating a relationship between average amplitudes of an IQ signal and the sign of a power difference PD on an IQ plane.

FIGS. 16(a) and (b) are schematic diagrams illustrating relationships between the average amplitude of an IQ signal and the sign of the power difference PD on an IQ plane. FIGS. 16(a) and 16(b) illustrate the case where the phase difference between the in-phase component I" and the quadrature component Q" is larger than 90 degrees and the case where the phase difference is smaller than 90 degrees, respectively.

Since the average power PV is considered to be constant, the sign of the power difference PD obtained from subtracting the power value PB from the average power PV is determined based on a relationship between the perfect circle S and the ellipse SP. Specifically, in the case of FIG. 16(a), the value of the power difference PD is substantially invariably positive in an area A (first and third quadrants), and is substantially invariably negative in an area B (second and fourth quadrants).

Therefore, the quadrature skew error detecting section 350 inverts the sign of the power difference PD and integrates the sign-inverted power difference PD when signal points of an IQ signal are present in the first and third quadrants, and integrates the power difference PD as it is when the signal points are present in the second and fourth quadrants. Since the sign of the power difference PD to be integrated is caused to be substantially invariably negative, the quadrature skew error detecting section 350 outputs quadrature skew error information so that the quadrature skew converges to a small value.

In the case of FIG. 16(b), the value of the power difference PD is substantially invariably negative in the area A (first and third quadrants), and is substantially invariably positive in the area B (second and fourth quadrants). Also in this case, the quadrature skew error detecting section 350 inverts the sign of the power difference PD and integrates the sign-inverted power difference PD when signal points of an IQ signal are present in the first and third quadrants, and integrates the power difference PD as it is when the signal points are present in the second and fourth quadrants. Since the sign of the power difference PD to be integrated is caused to be substantially invariably positive, the quadrature skew error detecting section 350 outputs quadrature skew error information so that the quadrature skew converges to a small value.

Figure 17:
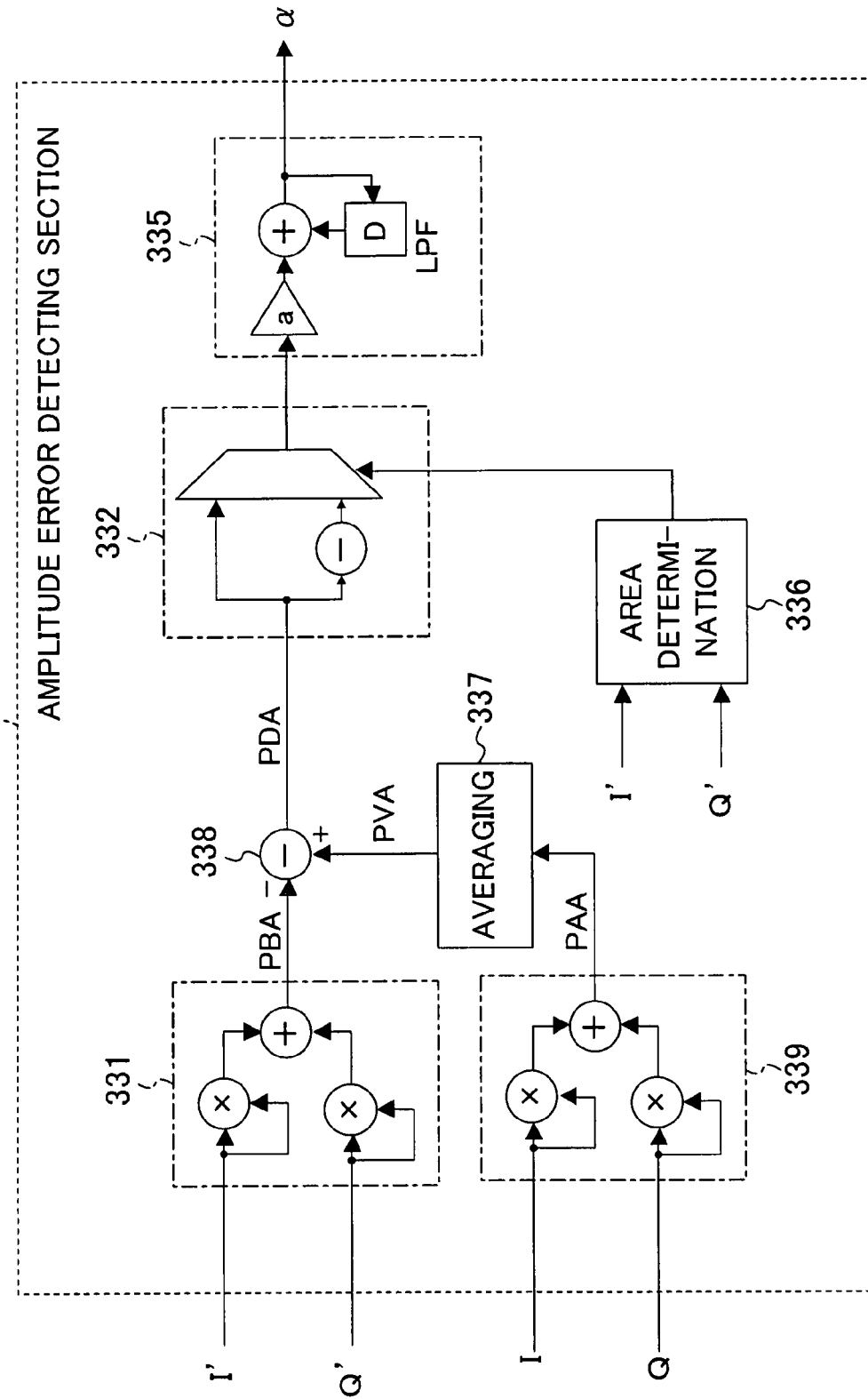
FIG. 17 is a block diagram illustrating an exemplary configuration of an amplitude error detecting section of FIG. 13.

FIG. 17 is a block diagram illustrating an exemplary configuration of the amplitude error detecting section 330 of FIG. 13. The amplitude error detecting section 330 comprises power calculating sections 331 and 339, a sign determining section 332, an LPF 335, an area determining section 336, an averager 337, and a subtractor 338.

The power calculating sections 331 and 339 have the same configuration as that of the power calculating section 51 of FIG. 9. The power calculating section 339 obtains and adds power values of the in-phase component I and the quadrature component Q of an IQ signal before amplitude correction, and outputs the result as a power value PAA to the averager 337. The averager 337 averages the power value PAA, and outputs a resultant average power PVA to the subtractor 338. The power calculating section 331 obtains and adds power values of the in-phase component I' and the quadrature component Q', and outputs the result as a power value PBA to the subtractor 338. The subtractor 338 subtracts the power value PBA from the average power PVA, and outputs the result as a power difference PDA to the sign determining section 332.

The area determining section 336 outputs "1" when the absolute value of the in-phase component I' is larger than the absolute value of the quadrature component Q', and "0" when the absolute value of the quadrature component Q' is larger than the absolute value of the in-phase component I', as an area determination signal to the sign determining section 332. The sign determining section 332 has substantially the same configuration as that of the sign determining section 52 of FIG. 9. The sign determining section 332 inverts the sign of the power difference PDA when the area determination signal is "0", and does not change the sign of the power difference PDA when the area determination signal is "1", before outputting the power difference PDA to the LPF 335. The LPF 335 integrates the output of the sign determining section 332, i.e., accumulates the output of the sign determining section 332 after gain adjustment, and outputs the result as an in-phase amplitude error magnification factor α.

Figure 18:
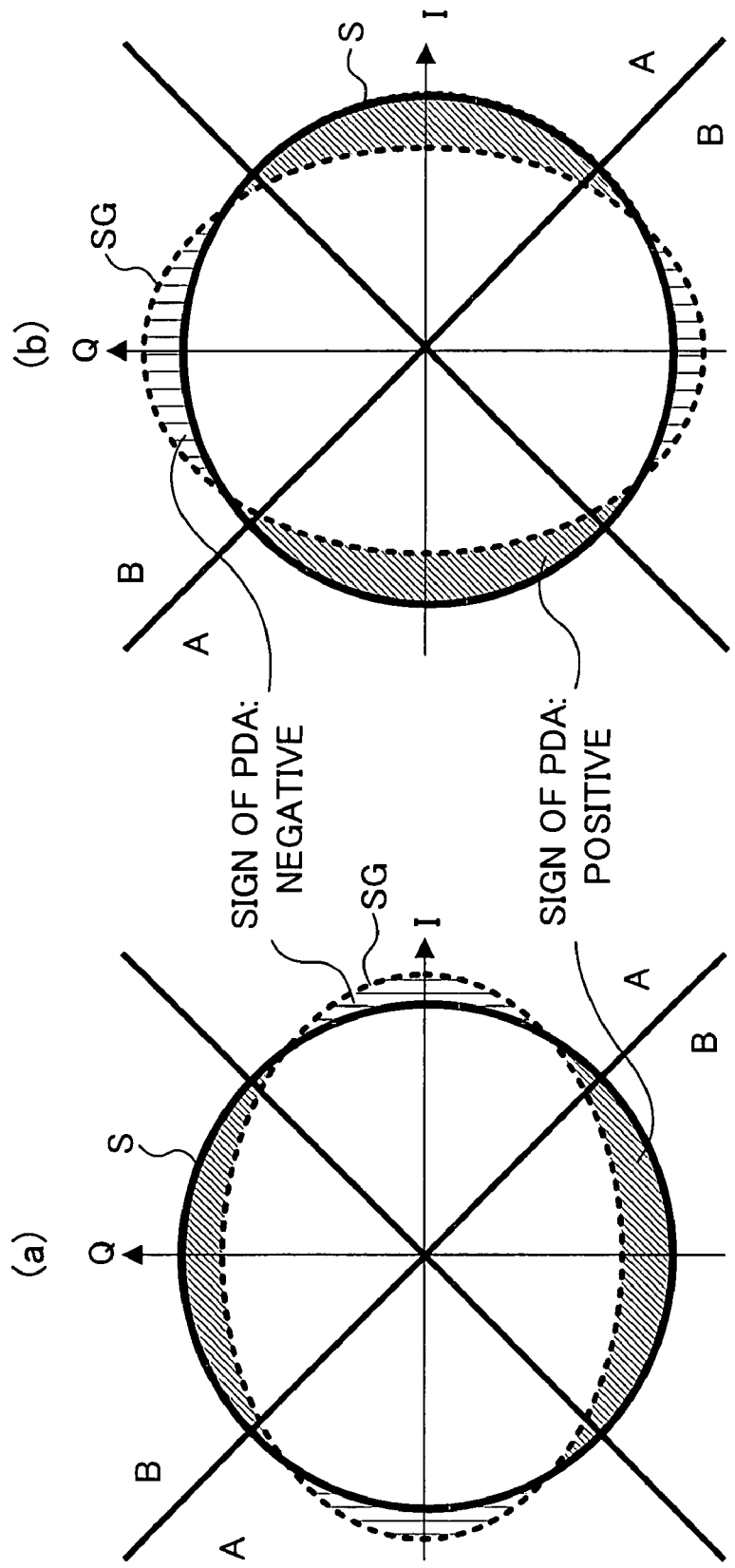
FIG. 18 is a schematic diagram illustrating a relationship between average amplitudes of an IQ signal and the sign of a power difference PDA on an IQ plane.

FIGS. 18(a) and 18(b) are schematic diagrams illustrating relationships between the average amplitude of an IQ signal and the sign of the power difference PDA on an IQ plane. FIG. 18(a) illustrates the case where the amplitude of the in-phase component I' is larger than the amplitude of the quadrature component Q'. FIG. 18(b) illustrates the case where the amplitude of the quadrature component Q' is larger than the amplitude of the in-phase component I'.

When the amplitude of the in-phase component I' is larger than the amplitude of the quadrature component Q', the average amplitude of an IQ signal having these as components thereof is represented by ellipses SG of FIGS. 18(a) and 18(b). The radius of a perfect circle S of FIGS. 18(a) and 18(b) is the square root of the average power PVA of the IQ signal.

Since the average power PVA is considered to be constant, the sign of the power difference PDA obtained by subtracting the power value PBA from the average power PVA is determined based on a relationship between the perfect circle S and the ellipse SG. Specifically, in the case of FIG. 18(a), the value of the power difference PDA is substantially invariably negative in an area A (area of |I|>|Q|), and is substantially invariably positive in an area B (area of |Q|>|I|).

Therefore, when signal points of an IQ signal are present in the area of |I|>|Q|, the area determining section 336 outputs "1" as the area determination signal, so that the amplitude error detecting section 330 integrates the power difference PDA as it is. When signal points are present in the area of |Q|>|I|, the area determining section 336 outputs "0" as the area determination signal, so that the amplitude error detecting section 330 inverts the sign of the power difference PDA and integrates the sign-inverted power difference PDA. Since the sign of the power difference PDA to be integrated is caused to be substantially invariably negative, the amplitude error detecting section 330 outputs an in-phase amplitude error magnification factor α so that a difference in amplitude between the in-phase component I' and the quadrature component Q' is reduced.

In the case of FIG. 18(b), the value of the power difference PDA is substantially invariably positive in an area A (area of |I|>|Q|), and is substantially invariably negative in an area B (area of |Q|>|I|). Also in this case, the amplitude error detecting section 330 integrates the power difference PDA as it is when signal points of an IQ signal are present in the are of |I|>|Q|, and inverts the sign of the power difference PDA and integrates the sign-inverted power difference PDA when signal points are present in the area of |Q|>|I|. Since the sign of the power difference PDA to be integrated is caused to be substantially invariably positive, the amplitude error detecting section 330 outputs an in-phase amplitude error magnification factor α so that a difference in amplitude between the in-phase component I' and the quadrature component Q' is decreased.

Figure 19:
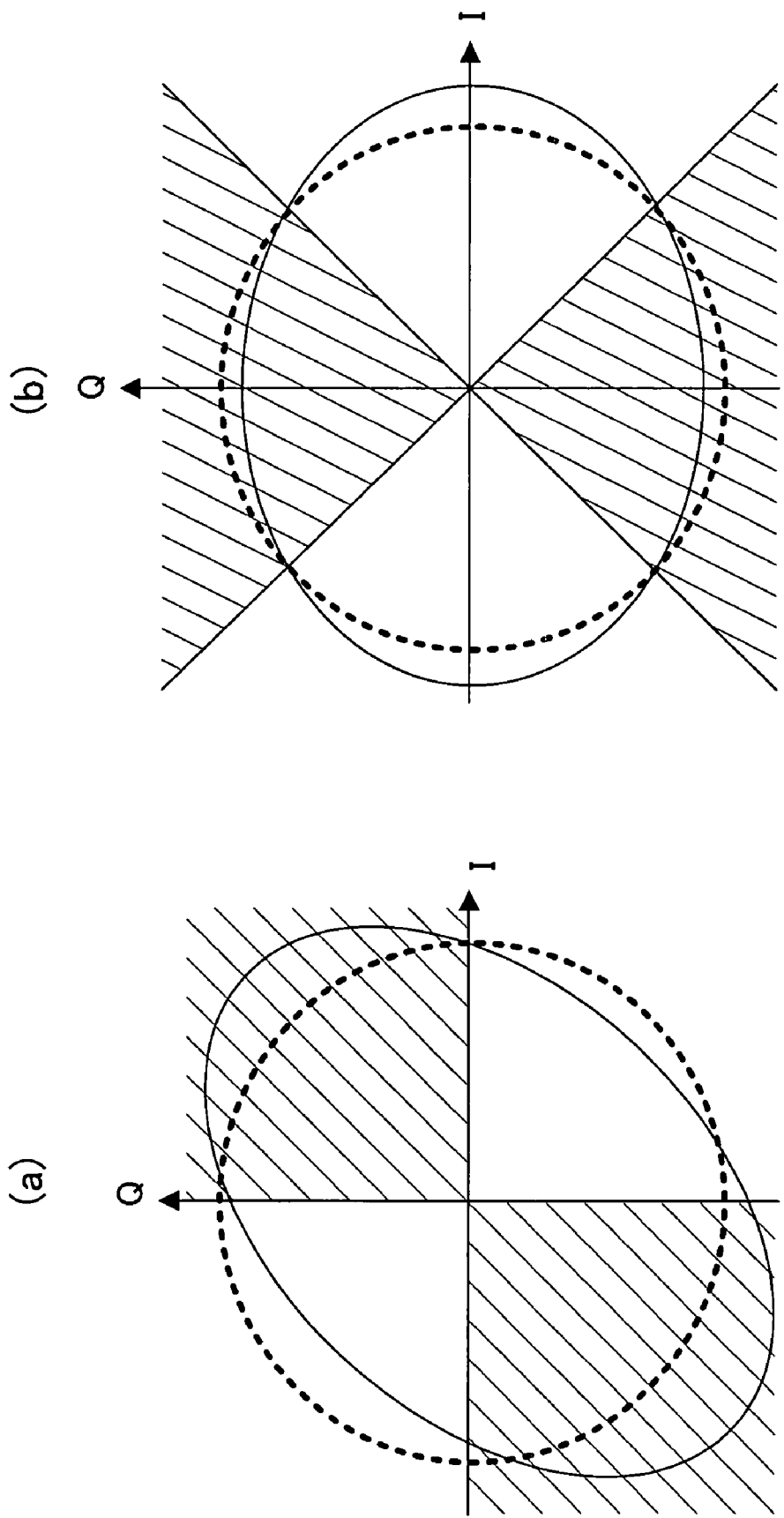
FIG. 19 is a diagram illustrating an area which needs to be determined, when detection of a quadrature skew error and an amplitude error is performed.

FIG. 19 is a diagram illustrating an area which needs to be determined, when detection of a quadrature skew error and an amplitude error is performed. FIG. 19(a) relates to detection of a quadrature skew error, and FIG. 19(b) relates to detection of an amplitude error. When amplitude error detection is performed, the entirety of FIG. 19(b) may be rotated by 45 degrees, and quadrant determination may be performed as in FIG. 19(a) instead of area determination in FIG. 19(b).

FIG. 20 is a block diagram illustrating a variation of the configuration of the amplitude/quadrature skew error compensating section of FIG. 17. An amplitude/quadrature skew error compensating section 415 of FIG. 20 is configured so that the in-phase component I'' and the quadrature component Q'' are input in place of the in-phase component I' and the quadrature component Q' to the amplitude error detecting section 330 in the amplitude/quadrature skew error compensating section 315 of FIG. 13. In the other regards, the amplitude/quadrature skew error compensating section 415 is the same as the amplitude/quadrature skew error compensating section 315.

In the amplitude/quadrature skew error compensating section 415, since the same signal is input to the power calculating section 351 of FIG. 14 and the power calculating section 331 of FIG. 17, either the power calculating section 351 or the power calculating section 331 may be shared. Specifically, the amplitude/quadrature skew error compensating section 415 may comprise only one of the power calculating sections 351 and 331, and the output of the one power calculating section may be input to the subtractors 338 and 358.

Since the input power and the output power of the amplitude correcting section 40 are equal to each other, either the power calculating section 359 or the power calculating section 339 may be shared. Further, either the averager 357 or the averager 337 may be shared, and either the subtractor 358 or the subtractor 338 may be shared.

When the average powers PA and PAA of an IQ signal are previously known as a reference power P', the power calculating sections 359 and 339 and the averagers 357 and 337 may not be provided, and the reference power P' may be input to the subtractors 358 and 338.

INDUSTRIAL APPLICABILITY

As described above, the present invention can correctly perform amplitude/quadrature skew error correction without a malfunction, and therefore, is useful for a demodulation device for demodulating a digital modulated signal, and the like.

The invention claimed is:

1. An amplitude error compensating device comprising:
an amplitude correcting section for performing amplitude correction with respect to an in-phase component and a quadrature component of a complex signal obtained by quadrature demodulation, based on amplitude error information, and outputting a resultant amplitude-corrected complex signal; and
an amplitude error detecting section for obtaining the amplitude error information, depending on amplitudes of an in-phase component and a quadrature component of the amplitude-corrected complex signal,
wherein the amplitude error detecting section comprises:
a power difference calculating section for obtaining as a power error a difference in power between the in-phase component and the quadrature component of the amplitude-corrected complex signal;
a rotation detecting section for detecting a rotation of a signal point of the amplitude-corrected complex signal, and outputting the result as a rotation detect signal;
an error information control section for outputting the power error when the rotation detect signal indicates that a rotation of the signal point has been detected, and 0 when the rotation detect signal indicates that a rotation of the signal point has not been detected; and
a smoothing section for smoothing an output of the error information control section, and outputting the result as the amplitude error information.

2. The amplitude error compensating device of claim 1, wherein the amplitude correcting section performs the amplitude correction so that a power of the complex signal obtained by quadrature demodulation and a power of the amplitude-corrected complex signal are equal to each other.

3. The amplitude error compensating device of claim 2, wherein the amplitude correcting section performs the amplitude correction by multiplying one of the in-phase component and the quadrature component of the complex signal obtained by quadrature demodulation by the amplitude error information, and the other by a value obtained by converting the amplitude error information in accordance with a predetermined relationship.

4. An amplitude error compensating device comprising:
an amplitude correcting section for performing amplitude correction with respect to an in-phase component and a quadrature component of a complex signal obtained by quadrature demodulation, based on amplitude error information, and outputting a resultant amplitude-corrected complex signal; and an amplitude error detecting section for obtaining the amplitude error information, depending on amplitudes of an in-phase component and a quadrature component of the amplitude-corrected complex signal, wherein the amplitude error detecting section comprises:

a first power calculating section for obtaining a power of the amplitude-corrected complex signal;

a second power calculating section for obtaining a power of the complex signal obtained by quadrature demodulation;

an averaging section for obtaining an average value of the power obtained by the second power calculating section, and outputting the average value as an average power;

a subtractor for obtaining a difference between the power obtained by the first power calculating section and the average power, and outputting the difference as a power difference;

an area determining section for determining to which of a plurality of areas on an IQ plane a signal point of the amplitude-corrected complex signal belongs, and outputting the result as an area determination signal;

a sign determining section for outputting the power difference or the power difference whose sign has been inverted, in accordance with the area determination signal; and a smoothing section for smoothing an output of the sign determining section, and outputting the result as the amplitude error information.

5. The amplitude error compensating device of claim 4, wherein the area determining section determines which of absolute values of the in-phase component and the quadrature component of the amplitude-corrected complex signal is larger than the other, and outputting the result as the area determination signal.

6. A quadrature skew error compensating device comprising:

a quadrature skew correcting section for performing quadrature skew correction with respect to a complex signal obtained by quadrature demodulation, based on quadrature skew error information, and outputting a resultant quadrature skew-corrected complex signal; and a quadrature skew error detecting section for obtaining a quadrature skew error between an in-phase component and a quadrature component of the quadrature skew-corrected complex signal, and outputting the quadrature skew error as the quadrature skew error information, wherein the quadrature skew error detecting section comprises:

a power calculating section for obtaining a power of the quadrature skew-corrected complex signal;

a quadrant determining section for determining to which of quadrants on an IQ plane a signal point of the quadrature skew-corrected complex signal belongs, and outputting the result as a quadrant determination signal;

a sign determining section for outputting a value of the power or the power whose sign has been inverted, as a power error, in accordance with the quadrant determination signal;

a rotation detecting section for detecting a rotation of the signal point of the quadrature skew-corrected complex signal, and outputting the result as a rotation detect signal;

an error information control section for outputting the power error when the rotation detect signal indicates that the rotation of the signal point has been detected, and 0 when the rotation detect signal indicates that the rotation of the signal point has not been detected; and a smoothing section for smoothing an output of the error information control section, and outputting the result as the quadrature skew error information.

7. A quadrature skew error compensating device comprising:

a quadrature skew correcting section for performing quadrature skew correction with respect to a complex signal obtained by quadrature demodulation, based on quadrature skew error information, and outputting a resultant quadrature skew-corrected complex signal; and a quadrature skew error detecting section for obtaining a quadrature skew error between an in-phase component and a quadrature component of the quadrature skew-corrected complex signal, and outputting the quadrature skew error as the quadrature skew error information, wherein the quadrature skew error detecting section comprises:

a multiplier for multiplying the in-phase component and the quadrature component of the quadrature skew-corrected complex signal, and outputting the result; and a smoothing section for smoothing the result of the multiplication by the multiplier, and outputting the result as the quadrature skew error information.

8. The quadrature skew error compensating device of claim 7, further comprising:

a frequency offset detector for detecting a frequency offset of the quadrature skew-corrected complex signal; and an error information control section for outputting the result of the multiplication by the multiplier to the smoothing section in accordance with the result of the detection by the frequency offset detector.

9. A quadrature skew error compensating device comprising:

a quadrature skew correcting section for performing quadrature skew correction with respect to a complex signal obtained by quadrature demodulation, based on quadrature skew error information, and outputting a resultant quadrature skew-corrected complex signal; and a quadrature skew error detecting section for obtaining a quadrature skew error between an in-phase component and a quadrature component of the quadrature skew-corrected complex signal, and outputting the quadrature skew error as the quadrature skew error information, wherein the quadrature skew error detecting section comprises:

a first power calculating section for obtaining a power of the quadrature skew-corrected complex signal;

a second power calculating section for obtaining a power of the complex signal obtained by the quadrature demodulation;

an averaging section for obtaining an average value of the power obtained in the second power calculating section, and outputting the average value as an average power;

a subtractor for obtaining a difference between the power calculated by the first power calculating section and the average power, and outputting the difference as a power difference;

a quadrant determining section for determining to which of quadrants on an IQ plane a signal point of the quadrature skew-corrected complex signal belongs, and outputting the result as a quadrant determination signal;

a sign determining section for outputting a value of the power difference or the power difference whose sign has been inverted, as a power error, in accordance with the quadrant determination signal; and a smoothing section for smoothing an output of the sign determining section, and outputting the result as the quadrature skew error information.

10. An amplitude/quadrature skew error compensating device comprising:

an amplitude correcting section for performing amplitude correction with respect to an in-phase component and a quadrature component of a complex signal obtained by quadrature demodulation, based on amplitude error information, and outputting a resultant amplitude-corrected complex signal;

an amplitude error detecting section for obtaining the amplitude error information, depending on amplitudes of an in-phase component and a quadrature component of the amplitude-corrected complex signal;

a quadrature skew correcting section for performing quadrature skew correction with respect to the amplitude-corrected complex signal, based on quadrature skew error information, and outputting a resultant quadrature skew-corrected complex signal; and a quadrature skew error detecting section for obtaining a quadrature skew error between an in-phase component and a quadrature component of the quadrature skew-corrected complex signal, and outputting the quadrature skew error as the quadrature skew error information.

* * * * *